United States Patent
Marque-Pucheu et al.

(10) Patent No.: US 9,301,303 B2
(45) Date of Patent: Mar. 29, 2016

(54) METHOD FOR SCHEDULING FREQUENCY CHANNELS

(75) Inventors: Gerard Marque-Pucheu, Verneuil sur Seine (FR); Christophe Gruet, Elancourt (FR); Vincent Seguy, Boulogne Billancourt (FR)

(73) Assignee: Cassidian SAS, Elancourt (FR)

( * ) Notice: Subject to any disclaimer, the term of this patent is extended or adjusted under 35 U.S.C. 154(b) by 327 days.

(21) Appl. No.: 13/825,481

(22) PCT Filed: Mar. 10, 2011

(86) PCT No.: PCT/EP2011/001170
§ 371 (c)(1),
(2), (4) Date: Mar. 21, 2013

(87) PCT Pub. No.: WO2012/037990
PCT Pub. Date: Mar. 29, 2012

(65) Prior Publication Data
US 2013/0188537 A1    Jul. 25, 2013

(30) Foreign Application Priority Data

Sep. 22, 2010  (FR) ..................................... 10 03775

(51) Int. Cl.
*H04W 72/04*    (2009.01)
*H04W 16/14*    (2009.01)
(52) U.S. Cl.
CPC .......... *H04W 72/0453* (2013.01); *H04W 16/14* (2013.01)

(58) Field of Classification Search
None
See application file for complete search history.

(56) References Cited

U.S. PATENT DOCUMENTS

| 2005/0170839 A1* | 8/2005 | Rinne et al. .................. 455/446 |
| 2008/0130486 A1* | 6/2008 | Lim et al. ...................... 370/210 |
| 2011/0206147 A1* | 8/2011 | Hariharan et al. ............ 375/260 |

* cited by examiner

*Primary Examiner* — Christine Duong
(74) *Attorney, Agent, or Firm* — Miller, Matthias & Hull LLP

(57) ABSTRACT

The invention concerns a method for scheduling frequency channels implemented in a device for a narrowband radiocommunication system sharing with a broadband radiocommunication system, each comprising a narrowband base station and a broadband base station, and the same frequency band, the frequency band being in part divided into a given number of frequency blocks, each comprising a given number of carrier frequencies to optionally be allocated to the narrowband base stations. The device comprises a means for associating carrier frequencies with the narrowband base stations and a means for distributing over the frequency band the carrier frequencies associated with the narrowband base stations such that each frequency block comprises at least two distinct groups of carrier frequencies, each associated with a different base station, the two groups of carrier frequencies being selected according to a distribution rule such that interference relating to the emission of the base stations associated with groups of carrier frequencies distributed in the same frequency block have a minimum interfered surface area.

12 Claims, 8 Drawing Sheets

METHOD FOR SCHEDULING FREQUENCY CHANNELS

CROSS-REFERENCE TO RELATED APPLICATIONS

This application is a 35 USC §371 U.S. national stage filing of International Patent Application No. PCT/EP2011/001170 filed on Mar. 10, 2011, which claims priority under the Paris Convention and 35 USC §119 to French Patent Application No. 10 03775, filed on Sep. 22, 2010.

FIELD OF THE DISCLOSURE

The present invention relates in a general manner to a method for scheduling frequency channels, also called carrier frequencies, for a narrowband radiocommunication system sharing with a broadband radiocommunication system, in one and the same geographical zone, radioelectric transmission sites and one and the same frequency band.

BACKGROUND OF THE DISCLOSURE

A radiocommunication system SY comprising a first broadband radiocommunication system $SY_{BB}$ and a second narrowband radiocommunication system $SY_{NB}$ which are deployed on the same radioelectric transmission sites in a determined geographical zone is known. The operator of these sites can thus offer over this same zone at one and the same time narrowband services and broadband services. According to the prior art, these two systems operate in separate frequency bands to avoid mutual interference.

With reference to FIG. 1, the radiocommunication system SY comprises a plurality of sites, called cells $C_1$ to $C_C$. For a better understanding of FIG. 1, only 4 cells $C_1$, $C_2$, $C_3$ and $C_c$ are detailed. Each cell $C_c$, with $1 \leq c \leq C$, comprises first and second base stations, respectively $BS_{BB,c}$, $BS_{NB,c}$ and mobile stations $MS_1$ to $MS_K$ which communicate with the base stations through the radio resources shared in the respective frequency bands $\Delta Fsy_{BB}$ for broadband communications and $\Delta Fsy_{NB}$ for narrowband communications. More particularly, each cell $C_c$ comprises a first base station $BS_{BB,c}$, called a broadband base station $BS_{BB,c}$ in the subsequent description, able to communicate radioelectrically with mobile stations in a broadband radiocommunication network of the first radiocommunication system $SY_{BB}$. Each cell $C_c$ also comprises a second base station $BS_{NB}$, called a narrowband base station $BS_{NB,c}$ in the subsequent description, able to communicate radioelectrically with mobile stations in a narrowband radiocommunication network of the second radiocommunication system $SY_{NB}$. The mobile stations present in a cell and operating according to a single one of the two modes of communication, broadband or narrowband, register respectively with one of the two base stations $BS_{BB,c}$ or $BS_{NB,c}$ according to their mode of operation. Mobile stations operating according to both modes of communication can register with one of the two base stations by choice or with both base stations.

For radiocommunication systems $SY_{BB}$ and $SY_{NB}$ of FDD (Frequency Division Duplex) type, the respective predetermined frequency bands $\Delta Fsy_{BB}$ and $\Delta Fsy_{NB}$ each comprise a first frequency band $\Delta Fsy_{BBe}$, respectively $\Delta Fsy_{BBe}$, for the emission of communications from the base stations $BS_{BB,c}$ or $BS_{NB,c}$ to the mobile stations, supplemented with a second frequency band of the same width $\Delta Fsy_{BBr}$, respectively $\Delta Fsy_{BBr}$, called the duplex band, for the receptions of communications originating from the mobile stations by the base stations $BS_{BB,c}$ or $BS_{NB,c}$. The first frequency band $\Delta Fsy_{BBe}$, respectively $\Delta Fsy_{BBe}$ and the second associated frequency band $\Delta Fsy_{BBr}$, respectively $\Delta Fsy_{NBr}$ are shifted by one and the same duplex gap $\Delta F_D$.

The broadband radiocommunication system $SY_{BB}$ is for example of the WIMAX ("Worldwide Interoperability for Microwave Access") type based on an Air interface according to the IEEE 802.16 standard, more particularly according to the 802.16m standard, or for example of the LTE (Long Term Evolution) standard which employs wide frequency bands $\Delta Fsy_{BBe}$ and $\Delta Fsy_{BBr}$ each typically greater than a MegaHertz, for example 1.25 MHz, 1.4 MHz, 3 MHz, 5 MHz, 10 MHz or 20 MHz.

As shown in FIG. 2A, in the broadband radiocommunication system $SY_{BB}$, each predetermined frequency band $\Delta Fsy_{BBe}$ and $\Delta Fsy_{BBr}$ is divided into J frequency blocks respectively $BFe_1$ to $BFe_J$ and $BFr_1$ to $BFr_J$, each of bandwidth $\Delta BF$, typically of a few hundred Kilo-Hertz, for example $\Delta BF=180$ kHz in the case of a system according to the LTE standard. Each block $BFe_j$, $BFr_j$, with $1 \leq j \leq J$, comprises N consecutive and regularly distributed carrier frequencies $F_{j,1} \ldots F_{j,n}, \ldots F_{j,N}$ of channel width $\Delta F=\Delta Fsy_e/(J \times N)$, with $1 \leq n \leq N$. For example, in the case of the LTE standard, N is equal to 12 and the interval $\Delta F$ between two consecutive sub-carriers is equal to 15 kHz, so that $\Delta BF=N \times \delta F=12 \times 15$ kHz=180 kHz.

Radio resources are allocated to a base station $BS_{BB,c}$ for a high data throughput transmission to (or from) a mobile station operating at least in broadband mode. FIG. 2B is an illustration of the radio resources shared by the broadband base stations $BS_{BB}$ in a downlink communication channel in the frequency band $\Delta Fsy_{BBe}$ during a time frame TP, and are similar in the uplink communication channel (not represented). A communication channel, downlink or uplink, of the LTE broadband system corresponds to the set of resources in the frequency band $\Delta Fsy_{BBe}$ (or $\Delta Fsy_{BBr}$) during a time frame TP. The radio resources are blocks of resources, each $BR_{j,tp}$ defined on a frequency block $BFe_j$ (or $BFr_j$ depending on the direction of the channel) during a specific time window tp, called a time pitch, consisting of several symbol times within the meaning of OFDM modulation. A communication channel comprises common sub-channels CNC for synchronization and broadcasting of the system information between the broadband base stations, and transport sub-channels for exchanges of data and of signaling between the base stations and the mobile terminals. The common sub-channels CNC correspond to a set of resource blocks extending over a few contiguous frequency blocks (six in the case of LTE) for a few symbol times and are repeated in part in the time frame TP. The other blocks of resources correspond to the transport sub-channels and are shared between the C base stations $BS_{BB,1}$ to $BS_{BB,c}$ of the radiocommunication system $SY_{BB}$ according to a known method for allocating resources, such as frequency reuse according to a specific factor for example a factor of 3 or a factor of 1, or such as fractional frequency reuse. With reference to FIG. 2B, on the frequency plan, several frequency blocks, for example blocks $BFe_j$ to $BFe_{j+5}$, comprise few resource blocks intended for the sub-channels CNC and resource blocks intended for the transport sub-channels. The other frequency blocks comprise resource blocks intended solely for the transport channels, for example the frequency block $BFe_1$ with reference to FIG. 2B.

The narrowband radiocommunication system $SY_{NB}$ is for example a TETRA ("TErrestrial Trunked RAdio") or TETRAPOL system whose channel width $\delta f$ is of the order of a few Kilo-Hertz for example 10 kHz, 12.5 kHz or 25 kHz, this width $\delta f$ also being the frequency pitch separating two carrier frequencies. With reference to FIG. 3A, the uplink and/or downlink communication frequency channel of the narrowband system between a narrowband base station and a mobile terminal corresponds to a carrier frequency $fe_{c,p}$ or $fr_{c,p}$ (represented $fe/r_{c,p}$ in FIG. 3A) of channel width $\delta f$. The useful bandwidth $\delta b$ of the filtered frequency signal is less than the width of the channel $\delta f$. For example, for a channel width $\delta f$ of 10 KHz the bandwidth $\delta b$ will be for example 8 KHz.

With reference to FIG. 3B, in the narrowband radiocommunication system $SY_{NB}$ of FDD type, the usual distribution of the frequency plan is such that to each cell $C_c$ are allocated two groups of P carrier frequencies $fe_{c,1} \ldots fe_{c,p}, \ldots fe_{c,P}$ and $fr_{c,1} \ldots fr_{c,p}, \ldots fr_{c,P}$ of channel width $\delta f$, which are respectively distributed over the frequency bands $\Delta Fsy_{NBe}$ and $\Delta Fsy_{NBr}$. For each frequency band $\Delta Fsy_{NBe}$ and $\Delta Fsy_{NBr}$, the distribution of the narrowband carrier frequencies allocated to one and the same base station, in one and the same cell $C_c$, complies with certain constraints between said frequencies.

A first constraint relating to the use of conventional coupling systems, more particularly coupling systems using cavities, for transmitting messages from the base station $BS_{NB,c}$ to the mobile terminals present in the cell, requires compliance with a first minimum frequency interval $\Delta fe$ between the carrier frequencies used in one and the same cell, for example $\Delta fe = 150$ kHz.

A second constraint makes it possible to avoid disturbances related to the use of too close frequency channels to transmit messages to the base station $BS_{NB,c}$, at one and the same time, by mobile terminals close to the base station $BS_{NB,c}$ and mobile terminals far removed from the base station $BS_{NB,c}$. This constraint imposes compliance with a second minimum frequency interval $\Delta\Delta fr$ between said carrier frequencies of one and the same cell, for example $\Delta fr = 20$ kHz, and which may be less than the first pitch $\Delta fe$.

As the frequency channels for uplink communication in the direction from mobiles to base station correspond, to within the duplex gap, to the frequency channels for downlink communication from the base station to the mobile stations, the minimum gaps between channels related to the constraints of the base station will lie identically, to within a frequency translation, in the other frequency sub-band corresponding to the uplink communications from the mobile stations to the base station.

Cells which are geographically sufficiently far apart can have identical carrier frequencies $fe_{c,p}$, $fr_{c,p}$ or groups or parts of groups of identical carrier frequencies. The mutual interference of these cells in one and the same frequency channel is very low, the carrier-to-interference ratio determined in each of the cells as a function of the other cell being less than a specific threshold.

Standard allocations, such as these, of frequency blocks and of carrier frequencies are effective when they are applied respectively to a first and a second radiocommunication system, $SY_{BB}$ and $SY_{NB}$, located in distinct geographical zones, and/or working on distinct frequency bands $\Delta Fsy_{BB}$, $\Delta Fsy_{NB}$. If the communication systems $SY_{BB}$ and $SY_{NB}$, according to the invention, are located in one and the same geographical zone and share the same emission and reception frequency bands $\Delta Fsy_e$ and $\Delta Fsy_r$, the allocations of carrier frequencies on the one hand, and of frequency blocks, more particularly the transport channels, on the other hand, will produce mutual interference having a very negative effect on the service quality of said communication systems.

Indeed, according to a typical exemplary configuration, the carrier frequencies of the narrowband system $SY_{NB}$ have a channel width $\Delta f$ of 10 KHz and the first frequency interval $\Delta fe$ between two carrier frequencies of one and the same cell $C_c$ is 150 KHz. By assuming that each frequency block $BFe_j$, $BFr_j$ of the broadband system $SY_{BB}$ has a bandwidth $\Delta BF_j$ of 180 KHZ for the LTE systems, several frequency blocks, indeed all the frequency blocks potentially used by the broadband base station $BS_{BB,c}$ of the cell $C_c$ can each contain at least one carrier frequency of the narrowband base station $BS_{NB,c}$ belonging to the same cell $C_c$ and be interfered with by these carrier frequencies.

It is possible to limit this drawback by avoiding allocating a frequency block to a given cell, stated otherwise by neutralizing the block, when its allocation would be liable to create interference at the carrier frequencies of the narrowband system that are allocated in the same given cell or in cells sufficiently near to this given cell to undergo interference. Thus, these interfered frequency blocks become unusable by application of a strategy for sharing the radiocommunication system SY prohibiting the allocation of a frequency block $BFe_j$, $BFr_j$ to a broadband base station $BS_{BB}$ if it is interfered with by a carrier frequency of a base station $BS_{NB}$ located in the same cell or in a geographically close cell. The application of such a strategy mutually ensures the protection of the frequency blocks of the broadband system. Nonetheless, the number of neutralized frequency blocks may, in the configuration represented hereinabove, very severely reduce the capacity of the broadband communication system.

To alleviate this drawback, it is known to use multi-carrier frequency transmitters in the narrowband base stations of the narrowband communication system $SY_{NB}$. Such a transmitter groups together the carrier frequencies allocated to one and the same base station $BS_{NB,c}$ into a group of carrier frequencies distributed consecutively over a not very extended frequency band with a small frequency interval $\Delta lfe$ between each carrier frequency, for example $\Delta fe$ goes from 150 KHz to 20 KHz. The carrier frequency group allocated to the base station $BS_{NB,c}$ of the cell $C_c$ thus has a frequency bandwidth, for example of 140 KHz in the case of a group of 8 frequencies, that is less than the bandwidth of a frequency block, which in the previous example is 180 KHz. Depending on its position with respect to the frequency blocks, the group of carrier frequencies interferes with only one or two frequency blocks at most. The other frequency blocks that are not interfered with by this group of frequencies may potentially be allocated to the broadband base station $BS_{BB,c}$ belonging to the cell $C_c$. However, the carrier frequency groups allocated respectively to the narrowband base stations lying respectively in the cells adjacent to the cell $C_c$, may nonetheless be distributed over the whole of the frequency band of the radiocommunication system SY and thus interfere with several frequency blocks, indeed all the frequency blocks distributed over the frequency bands $\Delta Fsy_e$ and $\Delta Fsy_r$, rendering them unusable for the broadband base station $BS_{BB,c}$ of the cell $C_c$.

SUMMARY OF THE DISCLOSURE

The objective of the invention is to alleviate the drawbacks of the prior art through a method for scheduling carrier frequencies for a narrowband radiocommunication system sharing with a broadband radiocommunication system, in one and the same geographical zone, radioelectric transmission cells each comprising a narrowband base station and a broadband base station, and one and the same frequency band, the frequency band being in part divided into a given number of frequency blocks, each comprising a given number of carrier frequencies to optionally be allocated to the narrowband base stations. The method is characterized in that it comprises a step of distributing the carrier frequencies to be allocated to the narrowband base stations over the frequency band such that each frequency block comprises at least two distinct groups of carrier frequencies, each associated with a different narrowband base station, the two groups of carrier frequencies being selected according to a distribution rule such that interference relating to the emission of the narrowband base stations associated with groups of carrier frequencies distributed in one and the same frequency block have a minimum interfered surface area. The method makes it possible to minimize the interference of the carrier frequencies of the narrowband radiocommunication system over the set of frequency blocks of the broadband radiocommunication system which shares in part the same frequency band in the same geographical zone as the narrowband radiocommunication system.

According to one characteristic of the invention, in the distribution step the at least two selected groups of carrier frequencies are distributed in a frequency block by alternately intercalating each carrier frequency of one group with respectively each carrier frequency of the other group so as to comply with a minimum frequency gap between the carrier frequencies of one and the same group of carrier frequencies.

According to another characteristic of the invention, the method comprises an establishment of a frequency scheduling which associates each narrowband base station of the narrowband radiocommunication system with at least one group of carrier frequencies from among several groups of carrier frequencies distributed per frequency block over the frequency band according to the distribution rule.

According to a first implementation of the method of the invention, the method comprises the following successive steps:
  an association step determining a first set of first groups of carrier frequencies, each first group of carrier frequencies of which is associated with one or more narrowband base stations according to reuse rules, and
  the distribution step bijectively mapping each carrier frequency of one of the groups of the first set with a carrier frequency of a frequency block while complying, on the one hand, with the distribution rule and, on the other hand, with a minimum frequency gap between the carrier frequencies of one and the same group of carrier frequencies bijectively mapped with carrier frequencies of one and the same frequency block.

According to one characteristic of the first implementation of the method, the distribution step comprises a first iterative loop for selecting each frequency block of the frequency band and a second iterative loop for selecting each carrier frequency of the selected frequency block, and comprising in the second iterative loop a bijective mapping of the carrier frequency of the frequency block with a carrier frequency of the first set while complying with the distribution rule and the minimum frequency gap between carrier frequencies of one and the same group of carrier frequencies distributed in one and the same frequency block.

According to one variant of this characteristic, each second iterative loop comprises a step of bijectively mapping a carrier frequency of a first group of carrier frequencies with the selected carrier frequency of the selected frequency block as soon as another carrier frequency of the first group of carrier frequencies has been bijectively mapped with another carrier frequency of the frequency block selected during a previous second iterative loop.

According to another characteristic of the first implementation of the method, the number of carrier frequencies of each first group of carrier frequencies is at most equal to half of the number of carrier frequencies of a frequency block and the distribution step comprises an iterative loop for selecting each frequency block of the frequency band comprising a selection according to the distribution rule of two first groups of carrier frequencies belonging to the first set and a bijective mapping successively of a carrier frequency of the frequency block with alternately a carrier frequency of one of the first two groups while complying with the minimum frequency gap between carrier frequencies of one and the same first group of carrier frequencies According to a second implementation of the method of the invention, the method comprises the following successive steps:
  the step of distributing a first set of first groups of carrier frequencies, associated respectively with the narrowband base stations, each first group being distributed with at least one other different first group in one and the same virtual frequency block belonging to a set of virtual frequency blocks while complying with a minimum frequency gap between the carrier frequencies of one and the same group and while complying with the distribution rule, the set of virtual frequency blocks comprising a number greater than or equal to the given number of frequency blocks of the frequency band, and
  an association step for associating each virtual frequency block with a frequency block of the frequency band while complying with carrier frequency reuse rules.

The invention also relates to a narrowband radiocommunication system sharing with a broadband radiocommunication system, in one and the same geographical zone, radioelectric transmission cells each comprising a narrowband base station and a broadband base station, and one and the same frequency band, the frequency band being in part divided into a given number of frequency blocks, each comprising a given number of carrier frequencies to optionally be allocated to the narrowband base stations. The system is characterized in that the carrier frequencies of the narrowband radiocommunication system allocated to narrowband base stations are distributed over the frequency band such that each frequency block comprises at least two distinct groups of carrier frequencies, each allocated to a different narrowband base station, the two groups of carrier frequencies being selected according to a distribution rule such that interference relating to the emission of the narrowband base stations associated with groups of carrier frequencies distributed in one and the same frequency block have a minimum interfered surface area.

The invention also relates to a narrowband base station of a narrowband radiocommunication system sharing with a broadband radiocommunication system, in one and the same geographical zone, radioelectric transmission cells each comprising a narrowband base station and a broadband base station, and one and the same frequency band, the frequency band being in part divided into a given number of frequency blocks, each comprising a given number of carrier frequencies to optionally be allocated to the narrowband base stations. The narrowband base station is characterized in that the carrier frequencies allocated to the base station are distributed over the frequency band with other carrier frequencies allocated to other base stations so that each frequency block comprises at least two distinct groups of carrier frequencies, each allocated to a different narrowband base station, the two groups of carrier frequencies being selected according to a distribution rule such that interference relating to the emission of the narrowband base stations associated with groups of carrier frequencies distributed in one and the same frequency block have a minimum interfered surface area.

The invention also relates to a device for scheduling carrier frequencies for a narrowband radiocommunication system sharing with a broadband radiocommunication system, in one and the same geographical zone, radioelectric transmission cells each comprising a narrowband base station and a broadband base station, and one and the same frequency band, the frequency band being in part divided into a given number of frequency blocks, each comprising a given number of carrier frequencies to optionally be allocated to the narrowband base stations. The device is characterized in that it comprises a means for associating carrier frequencies with the narrowband base stations and a means for distributing over the frequency band the carrier frequencies associated with the narrowband base stations such that each frequency block comprises at least two distinct groups of carrier frequencies, each associated with a different narrowband base station, the two groups of carrier frequencies being selected according to a distribution rule such that interference relating to the emission of the narrowband base stations associated with groups of carrier frequencies distributed in one and the same frequency block have a minimum interfered surface area.

Finally, the invention pertains to a computer program able to be implemented in a scheduling device, said program comprising instructions which, when the program is executed in said scheduling device, carry out the scheduling of carrier frequencies, according to the method of the invention, for a narrowband radiocommunication system sharing with a broadband radiocommunication system, in one and the same geographical zone, radioelectric transmission cells each comprising a narrowband base station and a broadband base station, and one and the same frequency band, the frequency band being in part divided into a given number of frequency blocks, each comprising a given number of carrier frequencies to optionally be allocated to the narrowband base stations.

BRIEF DESCRIPTION OF THE DRAWINGS

Other characteristics and advantages of the present invention will be more clearly apparent on reading the following description of several embodiments of the invention given by way of nonlimiting examples, with reference to the corresponding appended drawings in which.

DETAILED DESCRIPTION OF THE DISCLOSURE

Unless specified otherwise, the various elements appearing in the various figures retain the same references.

Figure 1:
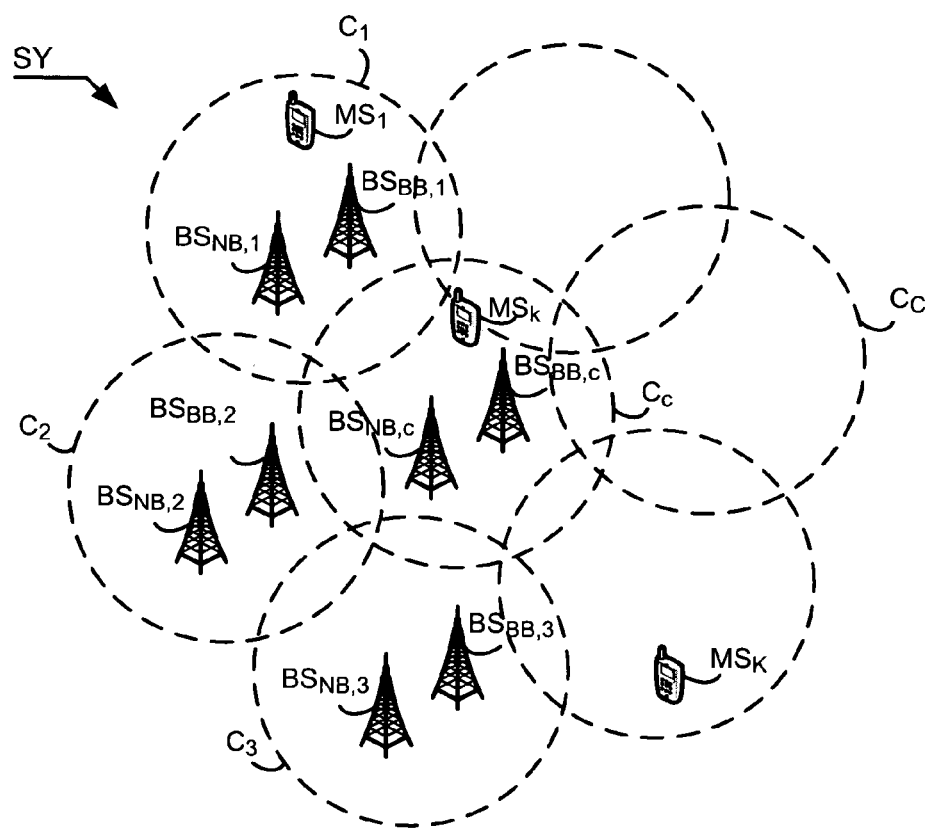
FIG. 1, already described, schematically shows a radiocommunication system.

The radiocommunication system of FDD type according to the invention is fairly similar to the radiocommunication system SY previously described with reference to FIG. 1 and comprises in one and the same geographical zone a first broadband radiocommunication system $SY_{BB}$ and a second narrowband radiocommunication system $SY_{NB}$ which are deployed in respective predetermined frequency bands $\Delta Fsy_{BB}$ and $\Delta Fsy_{NB}$ overlapping in part or totally and constituting a common frequency band $\Delta Fsy$, considered in the subsequent description to be the frequency band of the system SY. The radiocommunication system SY comprises a plurality of cells $C_1$ to $C_C$, each $C_c$, with $1 \leq c \leq C$, comprising first and second base stations, respectively $BS_{BB,c}$, $BS_{NB,c}$ and mobile stations $MS_1$ to $MS_K$ which communicate with the base stations through the radio resources shared in the common frequency band $\Delta Fsy$. More particularly, each cell $C_c$ comprises a first broadband base station $BS_{BB,c}$ able to communicate radioelectrically with mobile stations in a broadband radiocommunication network of the first radiocommunication system $SY_{BB}$. Each cell $C_c$ also comprises a second narrowband base station $BS_{NB}$ able to communicate radioelectrically with mobile stations in a narrowband radiocommunication network of the second radiocommunication system $SY_{NB}$.

The frequency band $\Delta Fsy$ also comprises a first frequency band $\Delta Fsy_e$ for the emission of downlink communications from the base stations $BS_{BB,c}$ or $BS_{NB,c}$ to the mobile stations, supplemented with a second frequency band of the same width $\Delta Fsy_r$, called the duplex band, for the receptions of uplink communications originating from the mobile stations by the base stations $BS_{BB,c}$ or $BS_{NB,c}$. These two frequency bands $\Delta Fsy_e$ and $\Delta Fsy_r$ are shifted by a duplex gap $\Delta F_D$. More particularly, in downlink communications, the frequency band $\Delta Fsy_e$ is formed by the frequency band $\Delta Fsy_{eBB}$ of the broadband radiocommunication system $SY_{BB}$ overlapping totally or in part the frequency band $\Delta Fsy_{eNB}$ of the narrowband radiocommunication system $SY_{NB}$. Likewise in uplink communications, the frequency band $\Delta Fsy_r$ is formed by the frequency band $\Delta Fsy_{rBB}$ of the broadband radiocommunication system $SY_{BB}$ overlapping totally or in part the frequency band $\Delta Fsy_{rNB}$ of the narrowband radiocommunication system $SY_{NB}$. Since the frequency scheduling method according to the invention is identical in each of the two frequency bands $\Delta Fsy_e(\Delta Fsy_{eBB}, \Delta Fsy_{eNB})$ and $\Delta Fsy_r(\Delta Fsy_{rBB}, \Delta Fsy_{rNB})$, only the frequency distribution of the two systems $SY_{BB}$ and $SY_{NB}$ is described on the first frequency band $\Delta Fsy_e$ in the subsequent description.

As described previously, with reference to FIGS. 2A and 2B, the broadband radiocommunication system $SY_{BB}$ is for example of the WIMAX ("Worldwide Interoperability for Microwave Access") type based on an Air interface according to the IEEE 802.16 standard, more particularly according to the 802.16m standard or for example of LTE ("Long Term Evolution") standard which employs wide frequency bands $\Delta Fsy_{BBe}$ and $\Delta Fsy_{BBr}$ each typically greater than a Megahertz, for examples 1.25 MHz, 1.4 MHz, 3 MHz, 5 MHz, 10 MHz or 20 MHz.

Figure 2A:
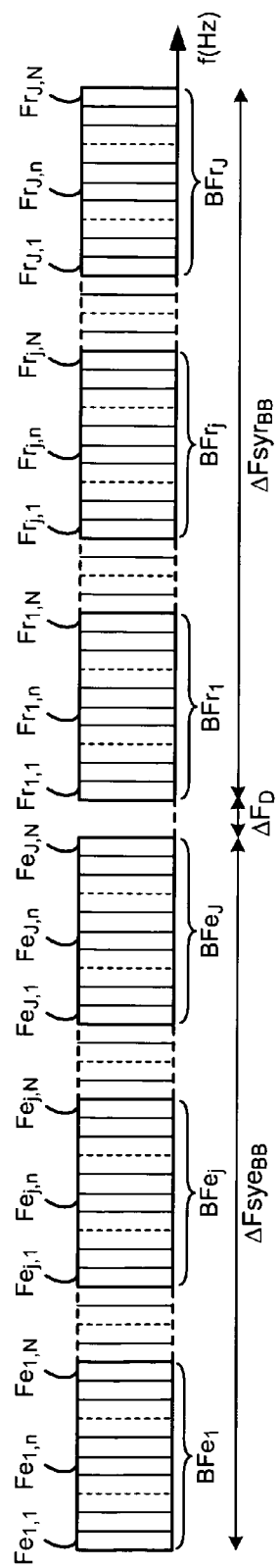
FIGS. 2A and 2B, already described, show a representation of a usual allocation of frequency channels for a broadband communication system.

As shown in FIG. 2A, in the broadband radiocommunication system $SY_{BB}$, the predetermined frequency band $\Delta Fsy_{BBe}$ is divided into J frequency blocks $BFe_1$ to $BFe_J$, each of bandwidth $\Delta BF$, typically of a few hundred Kilo-Hertz, for example $\Delta BF=180$ kHz in the case of a system according to the LTE standard. Each block $BFe_j$, with $1 \leq j \leq J$, comprises N consecutive and regularly distributed carrier frequencies $Fe_{j,1} \ldots Fe_{j,n} \ldots Fe_{j,N}$ of channel width $\Delta F = \Delta Fsy_e/(J \times N)$, with $1 \leq n \leq N$. For example, in the case of the LTE standard, N is equal to 12 and the interval δF between two consecutive sub-carriers is equal to 15 kHz, so that ΔBF=N×δF=12×15 kHz=180 kHz.

Figure 2B:
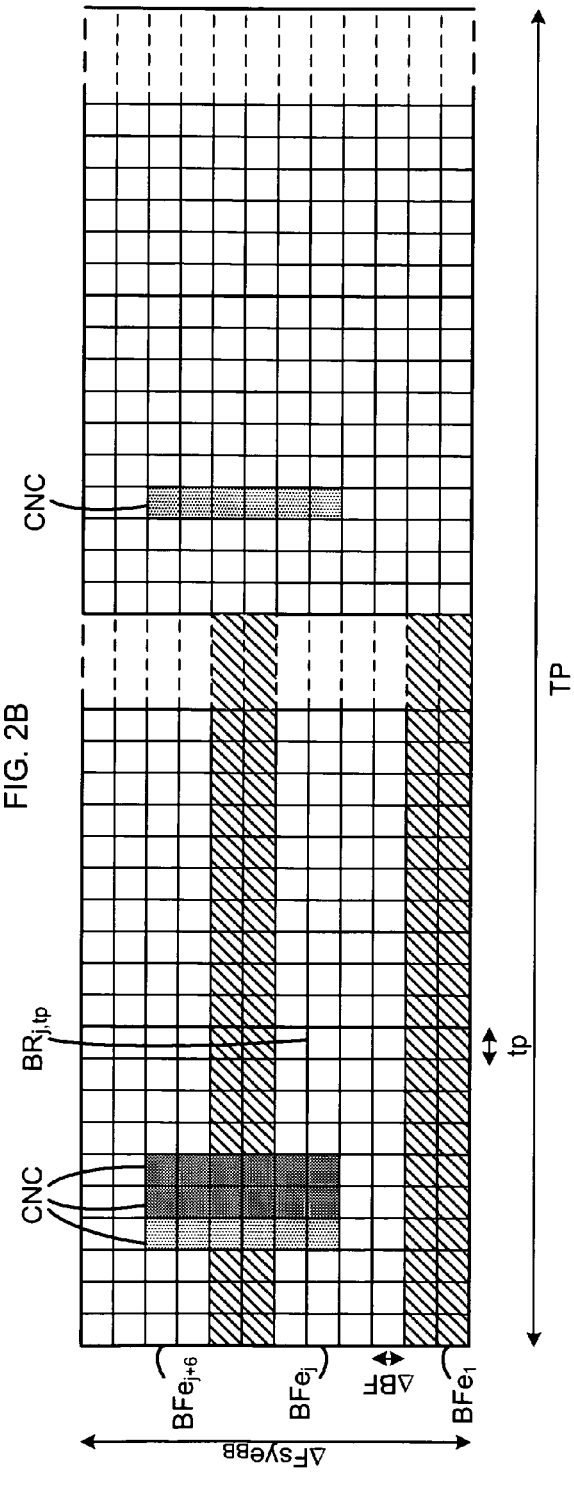
Figure 3A:
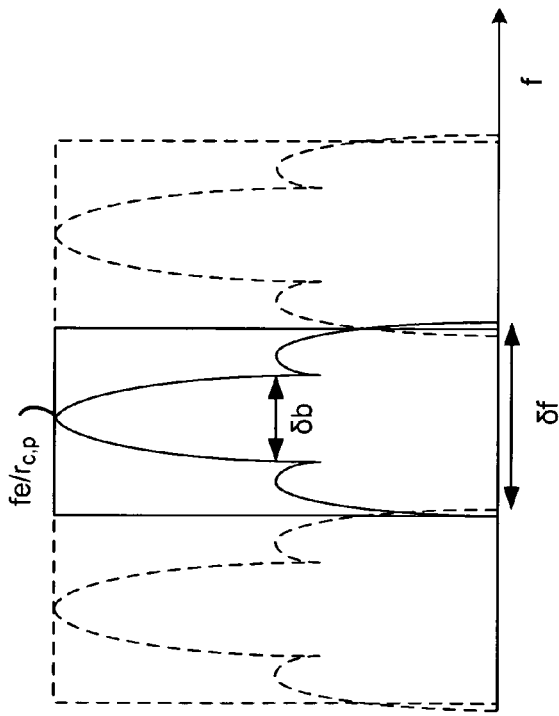
FIG. 3A, already described, shows a representation of a usual allocation of frequency channels for a narrowband communication system.
Figure 3B:
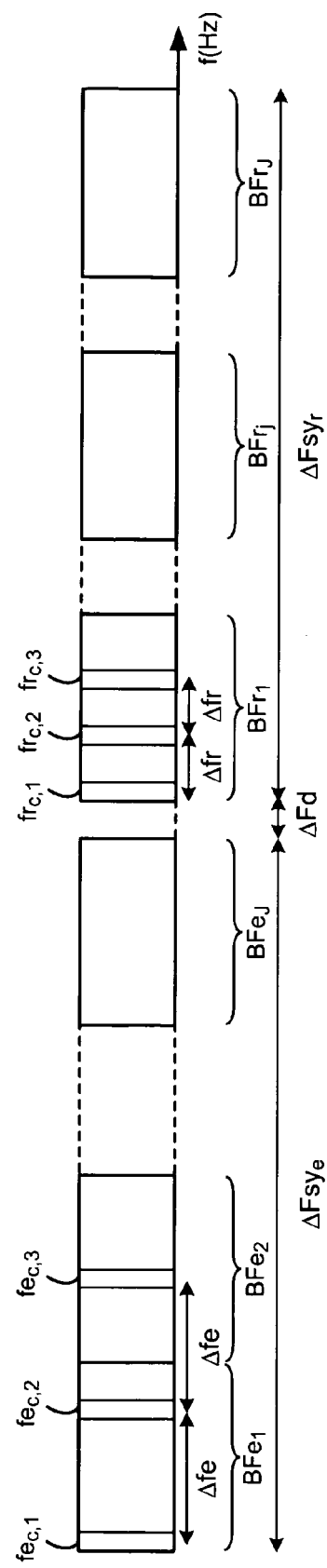
FIG. 3B, already described, shows a representation of a carrier frequency of a narrowband communication system.

Radio resources are allocated to a base station $BS_{BB,c}$ for a high data throughput transmission to (or from) a mobile station operating at least in broadband mode. FIG. 2B is an illustration of the radio resources shared by the broadband base stations $BS_{BB}$ in a downlink communication channel in the frequency band $\Delta Fsy_{BBe}$ during a time frame TP, and are similar in the uplink communication channel (not represented). A communication channel, downlink (or uplink), of the LTE broadband system corresponds to the set of resources in the frequency band $\Delta Fsy_{BBe}$ during a time frame TP. The radio resources are blocks of resources each ($BR_{j,tp}$) defined on a frequency block $BFe_j$ during a specific time window tp, called a time pitch. A communication channel comprises common sub-channels CNC for synchronization and broadcasting of the system information between the broadband base stations, and transport sub-channels for exchanges of data and of signaling between the base stations and the mobile terminals. The common sub-channels correspond to a set of resource blocks extending over a few contiguous frequency blocks for a few symbol times and are repeated in part in the time frame TP. The other blocks of resources correspond to the transport channels and are shared between the C base stations $BS_{BB,1}$ to $BS_{BB,C}$ of the radiocommunication system $SY_{BB}$ according to a known method for allocating resources. In the frequency plan, several frequency blocks, for example blocks $BFe_j$ to $BFe_{j+5}$ with reference to FIG. 2B, comprise a few resource blocks intended for the sub-channels CNC and resource blocks intended for the transport channels. The other frequency blocks comprise resource blocks intended solely for the transport channels, for example frequency block $BFe_1$ with reference to FIG. 2B.

The narrowband radiocommunication system $SY_{NB}$ is for example a TETRA ("TErrestrial Trunked RAdio") or TETRAPOL system in which the channel width δf of each carrier frequency is of the order of a few Kilo-Hertz. To each cell $C_C$, more particularly to each narrowband base station $SB_{NB,c}$, are allocated one or more groups of carrier frequencies $Ge_m$ with 1≤m≤M, from among M groups of carrier frequencies $Ge_1$ to $Ge_M$. Each group of carrier frequencies $Ge_m$ comprises F carrier frequencies $Fe_{m,1}$ to $Fe_{m,F}$. The set of carrier frequencies of each group is disjoint from one group to another group. One and the same group of carrier frequencies $Ge_m$ may be assigned to several mutually distant cells so as to avoid any frequency interference.

According to this configuration of the communication system, only the allocated resource blocks of the broadband communication system which are dedicated to the transport channels interfere with the carrier frequencies of the narrowband communication system that are allocated in the same frequency band. The resource blocks dedicated to the common channels CNC of a frequency block of the broadband communication system have negligible interference on the carrier frequencies of the narrowband communication system located in the same frequency band, the ratio of the mean power of the useful signal of the narrowband system to the mean power of the disturbing signal of the common channels CNC of the broadband system being much lower than the threshold of detrimental signal-to-noise ratio of the narrowband communication system.

Indeed, by assuming that the emission power of the narrowband system of TETRAPOL type is 42 dBm per carrier frequency and that the power of the broadband system of LTE type is 48 dBm over the whole of a 1.080 MHz channel (so-called 1.4 MHz nominal channel), the broadband power density during just the emission of the common channels CNC is about 48 dBm/MHz, since the latter occupy nearly the whole of the emission band (between 62 and 72 carriers of 15 kHz), but it will be only 27 dBm in a reception filter of the narrowband communication system having a bandwidth δb of 8 kHz (48 dBm decreased by the ratio between the bandwidths of 1 MHz and of 8 kHz, respectively, i.e. 21 dB). Moreover, the emission duration of the common channels is of the order of 5% of the time compared with the total emission duration of the channels of a broadband system and the mean power of the common channels is reduced by a factor of close to 20 corresponding to the duty ratio of their emission in the time frame and is therefore 13 dB lower on average, that is to say a power of 14 dBm=−27 dBm−13 dB in the band for reception of the disturbing signal by the narrowband communication system. The ratio between the narrowband useful signal and the common channels disturbing signal has a mean value of 28 dB=42 dBm−14 dBm, that is to say much lower than the threshold of detrimental signal-to-noise ratio of the narrowband system which in this case is 15 dB. On the contrary, if the resource blocks dedicated to the transport channels included in a frequency block are permanently allocated to communications of the broadband base station $BS_{BB}$, the attenuation due to the duty ratio of the transmission will not apply, the signal-to-noise ratio for identical propagation conditions will be only 15 dB=42 dBm−27 dBm, this being insufficient to avoid interference.

The frequency scheduling method according to the invention is implemented in a scheduling device DP while installing and configuring the narrowband base stations $SB_{NB,1}$ to $SB_{NB,C}$ respectively in the cells $C_1$ to $C_C$. The carrier frequency scheduling device DP will be described subsequently with reference to FIG. 5. The device DP will establish a frequency scheduling PF for the groups of carrier frequencies to be allocated to the narrowband base stations and distributed in the frequency band ΔFsye so as to minimize the interference between the two communication systems, as a function of the following three distribution rules which will characterize the method.

According to the first distribution rule RR1, the scheduling device DP distributes in a frequency block $BFe_j$, all or part of the set of carrier frequencies of a group $Ge_m$, subject to compliance with the second distribution rule RR2 hereinbelow, said frequency block being considered to be interfered with.

According to the second distribution rule RR2, to avoid interference between the carrier frequencies of one and the same group $Ge_m$ which is assigned to one or more cells, a minimum frequency gap Δfe must be complied with between each of the successive carrier frequencies belonging to the same group $Ge_m$ and distributed in one and the same frequency block, in accordance with the rules of the state of the art for allocating carrier frequencies in a narrowband communication system.

According to the third distribution rule RR3, a frequency block $BFe_j$ which is in part interfered with, that is to say some of the frequencies of whose frequency block have not yet been associated with cells of the system, will be supplemented with one or more carrier frequency groups selected in such a way that the geographical zone interfered with by the emission of the base stations associated with the groups of carrier frequencies distributed in the same frequency block has a minimum interfered surface area.

By applying the above rules in the scheduling method, the device DP schedules in one and the same frequency block $BFe_j$ on the one hand, according to the first distribution rule RR1 the carrier frequencies constituting a group of frequencies $Ge_m$ to be allocated to at least one narrowband base station of a cell $C_C$, said frequencies being distributed in the block white complying with the constraints of minimum frequency gap according to the second distribution rule RR2 and, on the other hand, according to the third distribution rule RR3 to group together in this same frequency block $BFe_j$ the carrier frequencies constituting one or more other groups of carrier frequencies to be allocated to narrowband base stations of cells which are different from the cell $C_C$ but sufficiently close to the latter. This frequency block $BFe_j$ is consequently completely interfered with by the carrier frequencies to be allocated to narrowband base stations belonging to the cell $C_C$ and to the cells adjacent to $C_C$, other frequency blocks of the frequency band of the radiocommunication system not being interfered with by these carrier frequencies and then being able to be used by the broadband base stations of the cell $C_C$. In the frequency blocks that are not interfered with, or very slightly, by the frequencies of the cell $C_C$, carrier frequencies of the narrowband base stations of the cells geographically distant from the cell $C_C$ can also be distributed without interfering in the broadband communications of the broadband base station of the cell $C_C$.

Once the frequency scheduling PF has been established, which associates each narrowband base station of the narrowband radiocommunication system with at least one group of carrier frequencies from among several carrier frequency groups distributed per frequency block over the frequency band according to the above distribution rules, the device DP transmits the scheduling PF to an operator of the radiocommunication system so that he allocates carrier frequencies of the frequency band to each narrowband base station as scheduled in the frequency scheduling PF.

Figure 4:
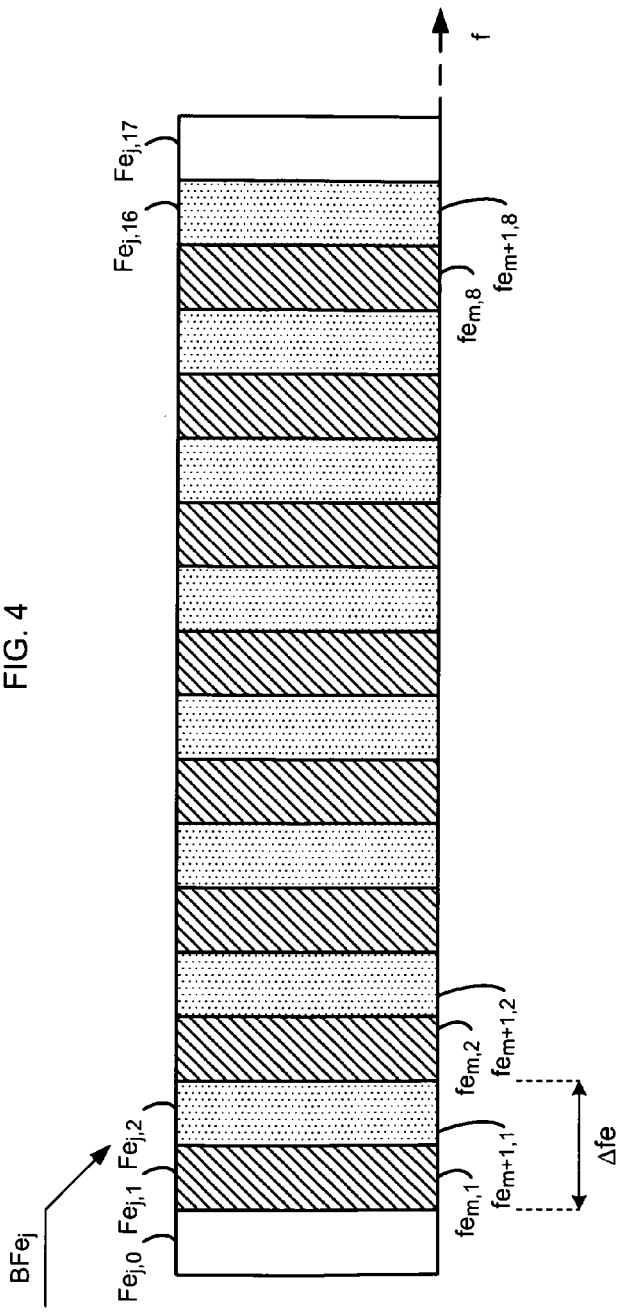
FIG. 4 shows a representation of allocation of carrier frequencies for a narrowband radiocommunication system according to the invention.

FIG. 4 illustrates an example of distribution according to the distribution rules RR1, RR2 and RR3 in a frequency block $BFe_j$ of a first group $Ge_m$ of eight carrier frequencies $fe_{m,1}$ to $fe_{m,8}$ allocated to a first narrowband base station of a first cell $C_C$ and of a second group $Ge_{m+1}$ of eight carrier frequencies $fe_{m+1,1}$ to $fe_{m+1,8}$ allocated to a second narrowband base station of a second cell $C_{c+1}$ adjacent to the first cell $C_c$. The two base stations belong to a narrowband communication system $SY_{NB}$ of TETRAPOL type, each frequency of which has a channel width $\delta f$ of 10 KHz, a bandwidth $\delta b$ of 8 KHz and a minimum frequency gap between each frequency of one and the same group $\Delta fe$ of 20 KHz. The broadband communication system $SY_{BB}$ located in the same frequency band as the narrowband communication system $SY_{NB}$ is of LTE type and possesses a spectral width $\Delta Fsye_{BB}$ of 1.4 Mhz with a frequency block width $\Delta BF_j$ equal to 180 KHZ. As represented in FIG. 4, the two groups of carrier frequencies $Ge_m$ and $Ge_{m+1}$ are interleaved by alternately intercalating a carrier frequency of the first group with a carrier frequency of the second group so as to comply with the minimum frequency gap $\Delta fe=20$ KHz according to the second distribution rule RR2. In FIG. 4, a frequency block $BFe_j$ according to the LTE system of a total width of 180 kHz corresponds to the union of 18 carrier frequencies, denoted $Fe_{j,0}$ to $Fe_{1j,15}$, of the narrowband system with a channel width $\delta f$ of 10 kHz. The first group $Ge_m$ allocated to the first cell $C_C$ comprises the odd carriers denoted from $Fe_{j,1}$ to $Fe_{1j,15}$ and the second group $Ge_{m+1}$ allocated to the second cell $C_{c+1}$ comprises the even carriers denoted $Fe_{j,2}$ to $Fe_{j,16}$. The distribution of each group of carrier frequencies in a frequency block satisfies the frequency constraint of minimum frequency gap $\Delta fe$ equal to 20 kHz between two successive frequencies belonging to one and the same group. The last two carrier frequencies may be allocated to other cells of the radiocommunication system SY while complying with the distribution rules RR1, RR2 and RR3.

It will be noted that if it were necessary to allocate more than eight carrier frequencies to a base station of the narrowband system, it would be possible to do so by separately allocating two groups of eight carrier frequencies belonging to two different frequency blocks, contiguous or not, the non-assignment of the carriers $Fe_{j,0}$ and $Fe_{j,17}$ in the previous case ensuring that whatever the case at issue, the constraint of minimum frequency gap will always be complied with between the carriers of two groups belonging to different frequency blocks.

Figure 5:
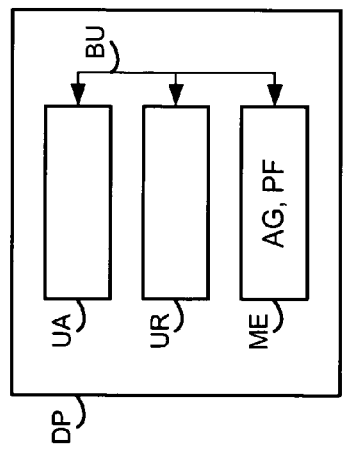
FIG. 5 shows a block diagram of a carrier frequency scheduling device of the radiocommunication system implementing the frequency scheduling method according to the invention.

With reference to FIG. 5, the frequency scheduling method is implemented in the scheduling device DP which comprises an association unit UA for associating groups of carrier frequencies with cells of the system SY according to reuse rules RU, a distribution unit UR for distributing groups of carrier frequencies in frequency blocks according to an algorithm AG and the distribution rules RR1, RR2 and RR3 and a memory ME comprising in particular the frequency scheduling PF for the groups of carrier frequencies to be allocated to the base stations of the narrowband radiocommunication system, distributed on the basis of frequency block of the broadband radiocommunication system, the scheduling PF being the result of the scheduling method according to the invention. The units UA, UR and ME of the device DP are represented in the form of functional blocks most of which ensure functions having a link with the invention and may correspond to software modules implemented in at least one processor and/or to dedicated and/or programmable hardware modules.

The storage unit ME also comprises information on the frequency bands $\Delta Fsy_{BB}$ and $\Delta Fsy_{NB}$ of the radiocommunications system, the number F of carrier frequencies per group of carrier frequencies and to be associated with each cell, the value of the minimum frequency gap $\Delta fe$, the number J of frequency blocks distributed in the frequency band of the broadband system $\Delta Fsy_{BB}$ and the number N of carrier frequencies per frequency block.

The device can also comprise a communication interface for transmitting the frequency scheduling PF to the radiocommunication system SY so that the operator of the system implements the allocations of frequencies per cell according to the scheduling PF.

The scheduling device may be for example a server connected via a packet network to the radiocommunication system SY.

The distribution unit UR comprises for example one or more processors controlling the execution of a distribution algorithm AG taking the distribution rules RR1, RR2 and RR3 into account.

The association unit UA comprises for example one or more processors controlling the execution of an association algorithm taking the frequency reuse rules RU into account.

The memory ME is a recording medium in which programs may be saved. The memory ME is connected to the units UR and UA via a bidirectional bus BU and comprises volatile and/or nonvolatile memories such as EEPROM, ROM, PROM, RAM, DRAM, SRAM memories, etc. The algorithms implementing the scheduling method are stored in the memory ME.

The method for scheduling carrier frequencies to be allocated to the narrowband base stations of the radiocommunication system SY is implemented according to several embodiments of the invention described in greater detail hereinbelow. Each embodiment comprises two main steps: a step EA of associating groups of carrier frequencies with cells of the system and executed by the association unit UA of the device DP and a step ER of distributing the groups of frequencies in frequency blocks, executed by the distribution unit UR of the device DP. According to the first embodiment, the steps are executed in a first order EA and then ER. According to the second embodiment, the steps are executed in the reverse order ER and then EA.

The step EA of associating groups of carrier frequencies with narrowband base stations of the system consists in associating one and the same group of carrier frequencies with narrowband base stations of the radiocommunication system SY while complying with the reuse rules RU known to the person skilled in the art and applied to narrowband radiocommunication systems, all the narrowband base stations of the system having to be associated with at least one group of carrier frequencies.

The step ER of distributing the carrier frequencies in frequency blocks consists more particularly in distributing, in same frequency blocks, carrier frequency groups associated with narrowband base stations whose surface interfered with by the emission of said narrowband base stations associated with groups of carrier frequencies distributed in one and the same frequency block is a minimum, by applying the distribution rules RR1, RR2 and RR3 according to the invention.

The method also comprises, after the execution of the two steps EA and ER, the establishment of a frequency scheduling which associates each narrowband base station of the narrowband radiocommunication system with at least one group of carrier frequencies from among several carrier frequency groups distributed per frequency block over the frequency band according to the distribution rules.

According to the first embodiment of the scheduling method, in the association step EA, the association unit UA of the scheduling device DP determines a first set A of first groups of frequencies $A_1$ to $A_M$, each first group $A_m$, with $1 \leq m \leq M$, being associated with one or more cells of the radiocommunication system SY according to the frequency reuse rules RU. To each first group of frequencies $A_m$ is assigned a set of F frequencies $fa_{m,1}$ to $fa_{m,F}$ while complying with a minimum frequency gap $\Delta fe$ between each frequency $fa_{m,f}$ of the frequency group $A_m$. Each set of frequencies is disjoint from one first group of frequencies to another first group of frequencies. In the case where several first groups of frequencies are allocated to a cell $C_C$, the set of frequencies corresponding to the union of the sets of frequencies making up the first groups allocated to the cell comply with the minimum frequency gap $\Delta fe$. The reuse rules RU consist in associating one or more first groups of frequencies from among the M first groups of frequencies with each cell $C_C$ of the radiocommunication system SY, one and the same first group of frequencies possibly being associated with several different cells geographically distant from one another by a given gap avoiding frequency interference between these cells. These reuse constraints involve co-channel interference only.

In the distribution step ER, the distribution unit UR of the device DP bijectively maps each carrier frequency of one of the first groups of the set with a carrier frequency of a frequency block while complying, on the one hand, with the distribution rules and, on the other hand, with a minimum frequency gap between the carrier frequencies of one and the same first group of carrier frequencies bijectively mapped with carrier frequencies of one and the same frequency block. More particularly, the distribution unit UR of the device DP determines a second set Ge of M second groups of carrier frequencies $Ge_1$ to $Ge_M$, the carrier frequencies of each group $Ge_m$ being inter alia distributed preferably in a frequency block $BFe_j$ while complying with a minimum frequency gap between the carrier frequencies of one and the same second group included in one and the same frequency block. According to the first embodiment, the distribution step also comprises a bijective mapping $\phi$ of the frequencies of each group of the first set A with the frequencies of each group of the second set Ge thus making it possible to associate the frequencies of the M groups of the set Ge with the cells of the system SY in a manner identical to the association of the frequencies respectively of the M groups of the set A according to the association step EA by taking into account of the reuse rules RU and of the distribution rules RR1, RR2 and RR3. More precisely, the second set Ge of second groups of frequencies $Ge_1, \ldots, Ge_M$ with $1 \leq m \leq M$ is determined such that the first set $A[A_1 \cup \ldots \cup A_M]$ and the second set $Ge[Ge_1 \cup \ldots \cup Ge_M]$ are in bijection. A bijective mapping $\phi$ by bijection of the frequencies of the first set $A[A_1 \cup \ldots \cup A_M]$ with the frequencies of the second set $Ge[Ge_1 \cup \ldots \cup Ge_M]$ is thus determined while complying with the reuse rules RU and scheduling rules RR1, RR2 and RR3: $\phi(A)=Ge$.

According to the first embodiment of the invention, macrocells $M_1, \ldots M_M$ of the narrowband network are defined such that all the cells comprising a narrowband base station which is associated with a first group of frequencies $A_m$ constitute the macro-cell $M_m$, each macro-cell $M_m$ then comprising all the cells whose respective group of frequencies $A_m$ is associated. The various narrowband emitters of each of the macrocells retain all the characteristics inherited from the corresponding cells, in particular the characteristics of the antennal systems (radiation patterns in particular) and the emission powers.

Figure 6A:
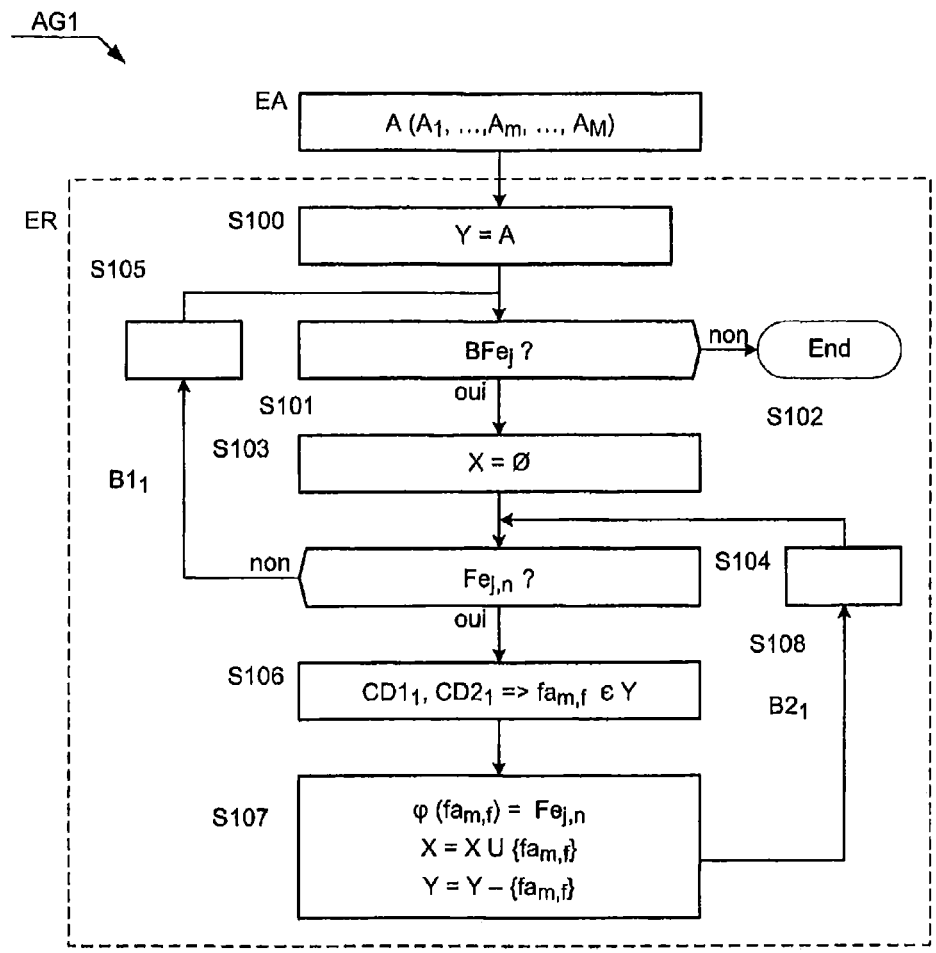
FIGS. 6A, 6B and 6C show respectively three variants of an algorithm for distributing carrier frequencies according to a first embodiment of the method of the invention.
Figure 6B:
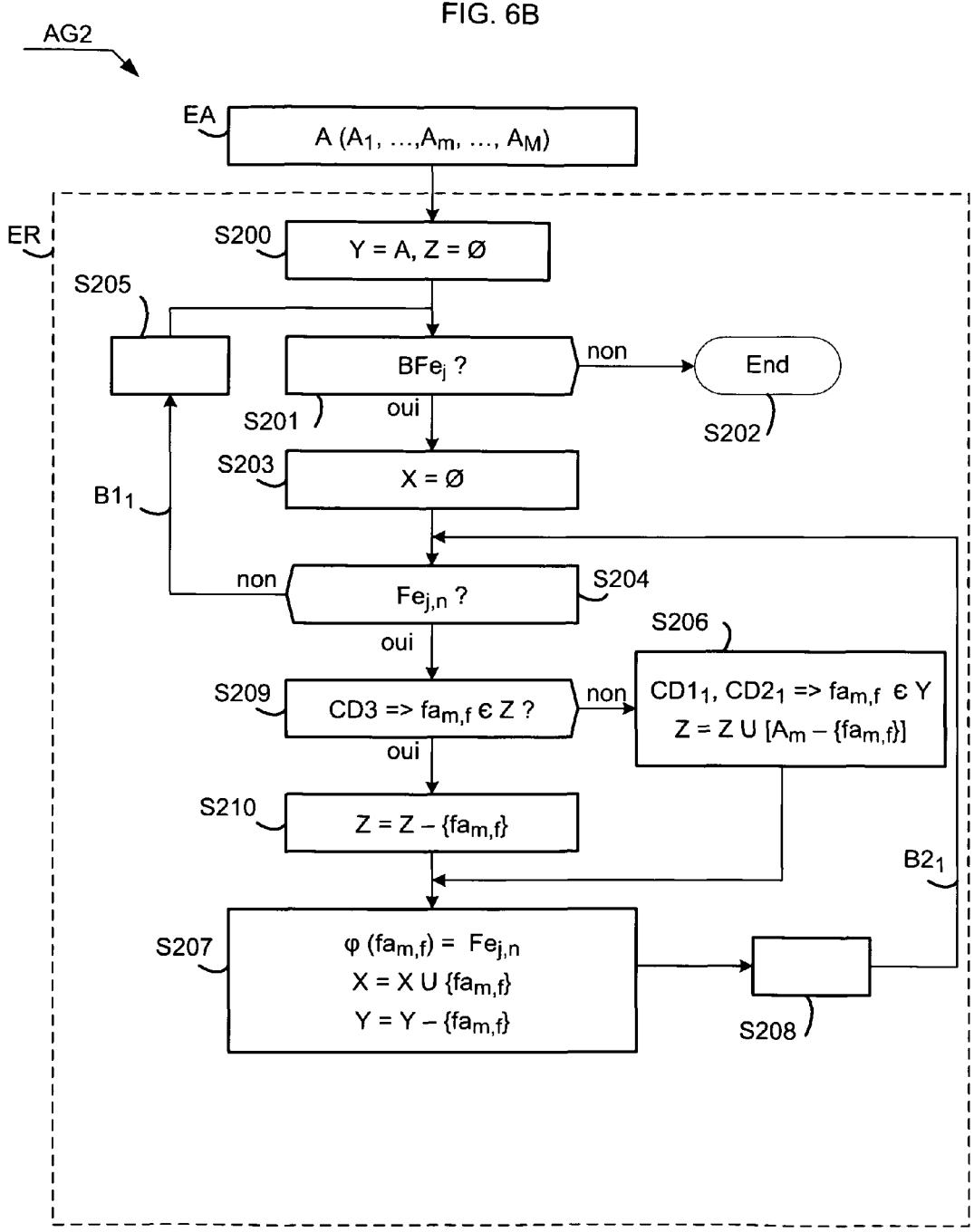
Figure 6C:
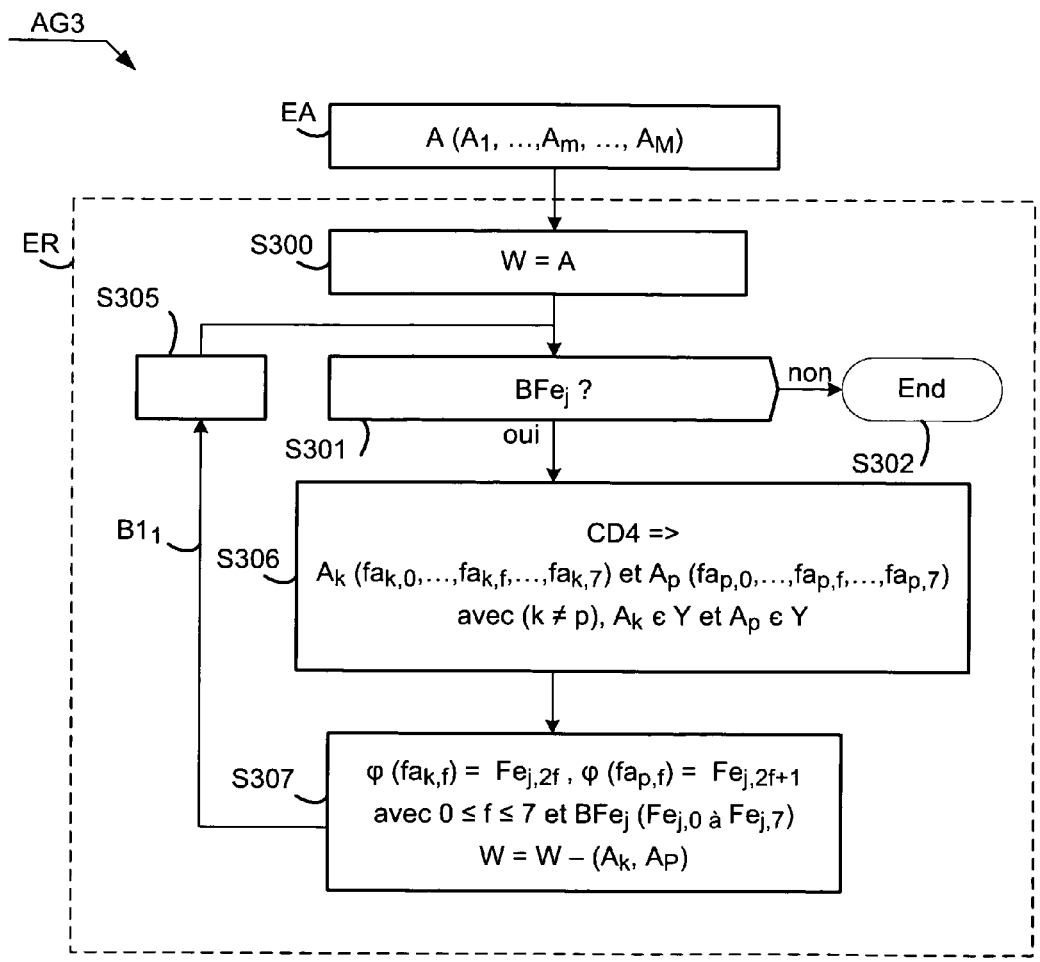

FIGS. 6A, 6B and 6C more particularly detail the step of distributing frequency ER according to respectively three different iterative algorithms AG1, AG2 and AG3, the main iteration $B1_1$ of which corresponds to each processing of a new different frequency block of the frequency band $\Delta Fsy_{BB}$. With each iteration in one of these algorithms, that is to say with each new frequency block selected by the distribution unit UR of the device DP according to the invention, bijective mappings of carrier frequencies of the set A with frequencies of the new selected frequency block considered to be the frequency block undergoing processing are executed, the carrier frequencies of the frequency block undergoing processing belonging to the second set Ge. The frequency blocks all of whose frequencies have already been bijectively mapped with carrier frequencies of the set A are considered to be processed.

The distribution step ER according to the first algorithm AG=AG1, with reference to FIG. 6A comprising steps S100 to S108. The algorithm AG1 comprises the first iterative loop $B1_1$ making it possible to select each frequency block of the frequency band $\Delta Fsy_{BB}$ and comprises a second iterative loop $B2_1$ included in the first loop $B1_1$ for selecting from the frequency block $BFe_j$, each carrier frequency $fg_{m,f}=Fe_{j,n}$ to be bijectively mapped with a frequency $fa_{m,f}$ of the set A, with $1 \leq f \leq F$, while complying with the distribution rules RR1, RR2 and RR3.

In step S100, the device DP defines a third set Y comprising the carrier frequencies of the set A which have not yet been processed, that is to say which have not yet been bijectively mapped with a frequency $Fe_{j,n}$ of the set Ge. The set Y is stored in the memory ME of the device DP and is initially equal to the set A.

In step S101, the unit UR executes the first iterative loop $B1_1$ and verifies whether the frequency band $\Delta Fsy_{BB}$ comprises at least one free frequency block $BFe_j$, that is to say not yet processed. If all the frequency blocks have been processed, no frequency block is free, the allocation method stops in step S102. In step S102, if there are still carrier frequencies of the set A that have not been distributed over the frequency band ΔFsy, they are in excess with respect to the frequency band of the broadband system $ΔFsy_{BB}$ and must therefore be distributed outside of this frequency band. This can be done according to any method known to the person skilled in the art. In this case, the frequency band $ΔFsy_{BB}$ of the broadband radiocommunication system $SY_{BB}$ overlaps only a part of the frequency band $ΔFsy_{NB}$ of the narrowband radiocommunication system $SY_{NB}$ which is larger.

In step S101, if there are still some free frequency blocks in the frequency band, the unit UR selects one of them, either in a successive manner by incrementing a variable associated with each index j of the blocks $BFe_j$, or in a random manner.

In step S103, the device DP defines an initially empty fourth set X, comprising the carrier frequencies of the set A which have already been bijectively mapped with carrier frequencies $Fe_{j,n}$ of the frequency block $BFe_j$. With each selection of a new frequency block, the set X is initialized to the empty set. The set X is stored in the memory ME.

In step S104, the unit UR executes the second iterative loop $B2_1$, verifying whether all the carrier frequencies of the frequency block $BFe_j$ have been processed. If frequencies of the block $BFe_j$ have not been processed, the unit UR selects one of them $Fe_{j,n}$, either in a successive manner by incrementing a variable associated with each index n of the frequencies $Fe_{j,n}$, or in a random manner. If all the N frequencies $Fe_{j,1}$ to $Fe_{j,N}$ of the frequency block $BFe_j$ have already been selected, the second iterative loop $B2_1$ stops and the first loop $B1_1$ is again iterated in step S105 so as to select a new frequency block in step S104.

During the selection of a new carrier frequency $Fe_{j,n}$ in the frequency block $BFe_j$, the unit UR selects in step S106, a carrier frequency $fa_{m,f}$ in the set Y which complies with the two distribution conditions $CD1_1$ and $CD2_1$ relating to the distribution rules RR1, RR2 and RR3.

According to the first condition $CD1_1$ relating more particularly to the rules RR1 and RR3, the carrier frequency $fa_{m,f}$ must be selected such that the frequency interference emitted by the macro-cells associated with the frequency $fa_{m,f}$ and with the frequencies of the set X—that is to say the frequencies already distributed in the frequency block $BFe_j$—, corresponds to the smallest interfered surface area Slmin. The unit UR determines the interfered surface area by means of frequency propagation prediction procedures known to the person skilled in the art for each frequency of the set Y, and selects the frequency $fa_{m,f}$ associated with the smallest interfered surface area and which also complies with the condition $CD2_1$. The condition $CD1_1$ makes it possible to reduce the choice of the frequencies to be selected of the set Y. The following are selectable, with regards to the condition $CD1_1$:

on the one hand the frequencies allocated to first cells for which carrier frequencies already distributed in the block $BFe_j$ are also allocated, the first distribution rule RR1 being complied with implicitly, and on the other hand the frequencies allocated to cells close to the first cells through compliance with the third distribution rule RR3 according to the minimum interfered surface area.

According to the second condition $CD2_1$, relating more particularly to the second distribution rule RR2, the frequency $fa_{m,f}$ must be selected in such a way that for any frequency Fα which belongs to the set X of frequencies distributed in the frequency block $BFe_j$ and is associated—together with the frequency $fa_{m,f}$—with one and the same cell of a macro-cell, each frequency φ(Fα) of the block of frequencies $BFe_j$ corresponding bijectively to each frequency Fα complies with the constraint of minimum frequency gap Δfe with respect to the frequency $Fe_{j,n}$ and according to the distribution rule RR2. This condition $CD2_1$ makes it possible to verify that the carrier frequencies belonging to the same group of frequencies and distributed in one and the same frequency block are spaced apart by a minimum frequency gap Δfe so as to avoid any frequency interference between frequencies associated with one and the same cell.

In step S107, the unit UR bijectively maps the frequency $fa_{m,f}$ with the frequency $Fe_{j,n}$: $φ(fa_{m,f})=Fe_{j,n}$, the frequency $fa_{m,f}$ belonging to the first set A of carrier frequencies and the frequency $Fe_{j,n}$ belonging to the second set Ge. The mapping is stored in the memory ME of the device DP. The sets X and Y are updated such that the frequency $fa_{m,f}$ is included in the set X ($X=X \cup \{fa_{m,f}\}$) and is excluded from the set Y ($Y=Y-\{fa_{m,f}\}$)). At the end of step S107, the unit UR repeats the second loop $B2_1$ in step S108 which loops back to step S104, so as to select a new carrier frequency of the frequency block $BFe_j$.

Once all the frequency blocks have been processed and all the carrier frequencies of the set A have been distributed in the frequency band ΔFsy of the system SY, the device DP establishes a frequency scheduling PF which associates for each cell $C_c$ of the system SY one or more groups of frequencies of the set Ge according to the reuse rules RU, the groups of frequencies being distributed per frequency block according to the distribution rules RR1, RR2 and RR3.

The device DP transmits the frequency scheduling PF to the radiocommunication system SY which will allocate to each narrowband base station the groups of frequencies scheduled in the frequency scheduling PF.

The algorithm AG1 provides an optimal definition of a frequency scheduling minimizing the number of frequency blocks interfered with by groups of frequencies allocated to narrowband base stations of adjacent cells of the radiocommunication system SY while complying with the constraints of frequency spacing between the carrier frequencies of the narrowband system. However, it requires at each second iterative loop $B2_1$, in order to satisfy the condition $CD1_1$ of step S106, a redetermination of the interfered surface area for each carrier frequency of the set Y.

The algorithm AG2, with reference to FIG. 6B decreases in a consequent manner the complexity of the algorithm AG1 by reducing the number of redetermination of the interfered surface area SI for each frequency of the set Y. Indeed, if during step S106 the set X already contains a frequency Fα belonging to a group $A_m$ of the set A, if the frequencies φ (Fα) and $Fe_{j,n}$ comply with the minimum spacing Δe constraint and if carrier frequencies of the group $A_m$ have not been processed, for example a frequency $fa_{m,f}$ then this frequency $fa_{m,f}$ quite obviously satisfies the first condition $CD1_1$ of step S106 since the surfaces interfered with by the emission of the frequencies of the set X and of the set X including the frequency $fa_{m,f}$ are equal by construction.

The distribution step ER according to the second algorithm AG=AG2, with reference to FIG. 6B, comprises steps S200 to S210. By comparison with the algorithm AG1, the algorithm AG2 also comprises a first iterative loop $B1_1$ and a second iterative loop $B2_1$. The steps of selecting a frequency block $BFe_j$ (S202, S203 and S205) are similar to the steps of the algorithm AG1 (respectively S102, S103 and S105), likewise the steps of selecting a carrier frequency $Fe_{j,n}$ of the frequency block $BFe_j$ (S204 and S208) are similar to the steps of the algorithm AG1 (respectively S104 and S108) and are therefore not described.

In step S200, the distribution unit UR defines an initially empty fourth set Z intended to comprise the carrier frequencies of the set A which have not yet been processed but which belong to groups of frequencies undergoing processing, that is to say which comprise at least one bijective frequency mapped with a frequency of the frequency block $BFe_j$.

After the selection of a frequency $Fe_{j,n}$ of the frequency block $BFe_j$ in step S204, the distribution unit UR verifies, in step S209, whether the set Z comprises a frequency $fa_{m,f}$ complying with a third condition CD3. According to this condition CD3, the carrier frequency $fa_{m,f}$ must be selected such that for any frequency $F\alpha$ belonging to the set X of the frequencies distributed in the frequency block $BFe_j$ and belonging—together with the frequency $fa_{m,f}$—to one and the same frequency group $A_m$, each frequency $\phi(F\alpha)$ of the block of frequencies $BFe_j$ corresponding bijectively to each frequency $F\alpha$ comply with the constraint of minimum frequency gap $\Delta fe$ with respect to the frequency $Fe_{j,n}$ according to the distribution rule RR2. In step S210, the set Z is updated such that the frequency $fa_{m,f}$ is excluded from the set Z. Next, the unit UR executes step S207 which is similar to step S107 of the first algorithm AG1.

If in step S209, the set Z does not comprise any frequency $fa_{m,f}$ complying with the condition CD3, the unit UR executes step S206 which is similar to step S106 of the first algorithm AG1 by adding an update of the set Z. In step S206, the unit UR selects a frequency $fa_{m,f}$ complying with the conditions $CD1_1$ and $CD2_1$ and belonging to a group of frequencies $A_m$ that has not yet been processed. At the end of step S206, the unit UR updates the set Z such that the set Z also comprises all the unprocessed frequencies of the frequency group $A_m$, that is to say all the frequencies of the group $A_m$ while excluding the frequency $fa_{m,f}$. Next the distribution unit executes step S207.

Once all the frequency blocks have been processed and all the carrier frequencies of the set A have been distributed in the frequency band $\Delta Fsy$ of the system SY, the device DP establishes the frequency scheduling PF and transmits it to the radiocommunication system SY.

According to a third variant the algorithm AG3 is very greatly simplified, in the case where the narrowband radiocommunication system is a TETRAPOL system with a channel width and an interval between carriers of 10 kHz, with groups of F=8 carrier frequencies (they could contain nine frequencies but this is almost never the case in practice) and with a minimum frequency gap $\Delta fer$ equal to 20 kHz. In that case, the number of carrier frequencies, F=8, of each group of carrier frequencies is at most equal to half of the number of carrier frequencies of a frequency block, N=18.

If after two iterations $B1_1$ the distribution unit selects two carrier frequencies which on account of the constraint $\Delta fe$ belong to different groups of carrier frequencies, then all the carrier frequencies of these groups will be selected alternately during the following steps.

Considering that the fill limit for the test of step S204 is fixed at 16 carrier frequencies instead of a maximum value of 18 carrier frequencies, the algorithm amounts to selecting pairs of groups of frequencies so as to map them bijectively with frequencies of a frequency block according to FIG. 4.

The distribution step ER according to the third algorithm AG=AG3, with reference to FIG. 6C, comprises steps S300 to S307. By comparison with the algorithms AG1 and AG2, the algorithm AG3 does not comprise any second iterative loop $B2_1$ and the sets X, Y and Z.

In step S300, the distribution unit UR defines a fifth set W comprising the groups of F=8 frequencies of the set A which was not processed by the unit UR. The set W is initially equal to the set A and is stored in the memory ME.

In step S301, the unit executes the iterative loop $B1_1$ by verifying whether the frequency band $\Delta Fsy_{BB}$ comprises at least one free frequency block $BFe_j$, as in steps S101 and S201 respectively of the algorithms AG1 and AG2. If all the frequency blocks have been processed, the allocation method stops in step S302 which is similar to steps S102 and S202 respectively of the algorithms AG1 and AG2.

In step S301, if there are still some free frequency blocks in the frequency band, the unit UR selects one of them and executes step S306. In step 306, the unit UR selects two groups of frequencies Ak and Ap—with the indices k≠p, 1≤k≤M and 1≤p≤M—, each comprising F=8 carrier frequencies $fa_{k,0}, \ldots, fa_{k,F-1}$ respectively $fa_{p,0}, \ldots, fa_{p,F-1}$, both belonging to the set W and which comply with a fourth condition CD4.

According to the condition CD4, relating more particularly to the rules RR1 and RR3, the groups Ak and Ap are selected such that the frequency interference emitted by the macrocells whose groups of carrier frequencies Ak and Ap have been associated (in the step EA), corresponds to the smallest interfered surface area Slmin. The unit UR determines the interfered surface area by means of frequency propagation prediction procedures known to the person skilled in the art for each pair of groups of carrier frequencies belonging to the set W, and selects the pair $(A_k, A_p)$ of groups of frequencies which is associated with the smallest interfered surface area.

At the end of step S306, the unit UR executes step S307 and bijectively maps each frequency $fa_{k,f}$ of the first frequency group $A_k$ with a frequency of even index $Fe_{n,2f}$ of the frequency block $BFe_j$: $\phi(fa_{k,f})=Fe_{n,2f}$ and each frequency $fa_{p,f}$ of the second frequency group $A_p$ with a frequency of odd index $Fe_{n,2f+1}$ of the frequency block $BFe_j$: $\phi(fa_{p,f})=Fe_{n,2f+1}$, with $0\leq f\leq F-1$, and the frequency block $BFe_j$ comprising the frequencies $Fe_{j,0}$ to $Fe_{j,17}$. The mappings are stored in the memory ME of the device DP. The set W is updated such that the frequency groups $A_k$ and $A_p$ are excluded from the set W (W=W-$\{A_k, A_p\}$). At the end of step S307, the unit UR repeats the loop $B1_1$ in step S308 which loops back to step S301, so as to select a new frequency block.

Once all the frequency blocks have been processed and all the carrier frequencies of the set A have been distributed in the frequency band $\Delta Fsy$ of the system SY, the device DP establishes the frequency scheduling PF.

This algorithm is slightly sub-optimal since only 16 carrier frequencies are distributed over the 18 available carrier frequencies of the frequency block. It is however simple and fast to execute.

As a variant the algorithm AG3 can again be simplified by noting that each group of carrier frequencies is selected only once throughout the execution of the algorithm and that the fourth condition CD4 may be replaced with the condition CD5 which is: the intersection of the surfaces interfered with by the frequency interference emitted by macro-cells associated with the groups of frequencies of $A_k$ and $A_p$ is a maximum.

According to a last simplifying variant of the algorithm AG3, interference matrices well known to the person skilled in the art may be used for each macro-cell $M_m$. By considering that the row of the interference matrix of a macro-cell contains the group of frequencies $A_k$, that is to say the percentage of the various cells interfered with by the macro-cell containing this group $A_k$, and that the corresponding row of the interference matrix for the macro-cell contains the group of frequencies $A_p$, the scalar product of the corresponding row vectors provides a good approximation of the degree of overlap of the surfaces interfered with by these two sets of cells and therefore of the nature of their intersection. In the algorithm AG, the condition CD4 is then replaced with the following condition: the scalar product of the rows of the interference matrix corresponding to the macro-cells containing the carrier frequencies of the groups $A_k$ and $A_p$ is a maximum.

These various algorithms AG1, AG2 and AG3 make it possible to realize a first embodiment of the method according to the invention when a prior association of the carrier frequencies of the narrowband system has been established for each cell $C_C$ of the system SY.

According to the second embodiment of the scheduling method, the scheduling device DP defines a first set B of C groups of carrier frequencies $B_1$ to $B_C$ associated respectively with the C cells of the radiocommunication system SY and each group comprising carrier frequencies, called different "virtual" frequencies. The virtual carrier frequencies can correspond for example to names of frequencies which will be associated subsequently with carrier frequencies of the frequency band $\Delta$Fsye of the radiocommunication system SY. The number of virtual carrier frequencies in a group can vary from one group to another. Each group $B_C$ is disjoint from another group of the set B. The device also defines a set of virtual blocks comprising an infinite number of frequency blocks, called virtual frequency blocks, $BFv_1, \ldots, BFv_h, \ldots, BFv\infty$ in some of which will be distributed the virtual carrier frequencies in the step ER. Each virtual frequency block $BFv_h$ comprises N carrier frequencies $Fv_{1,h}$ to $Fv_{N,h}$. The virtual frequency blocks can correspond for example to names of frequency blocks which will be associated, in the step EA, with the real frequency blocks $BFe_1$ to $BFe_j$ of the frequency band $\Delta Fsye_{BB}$ of the broadband radiocommunication system $SY_{BB}$.

Figure 7:
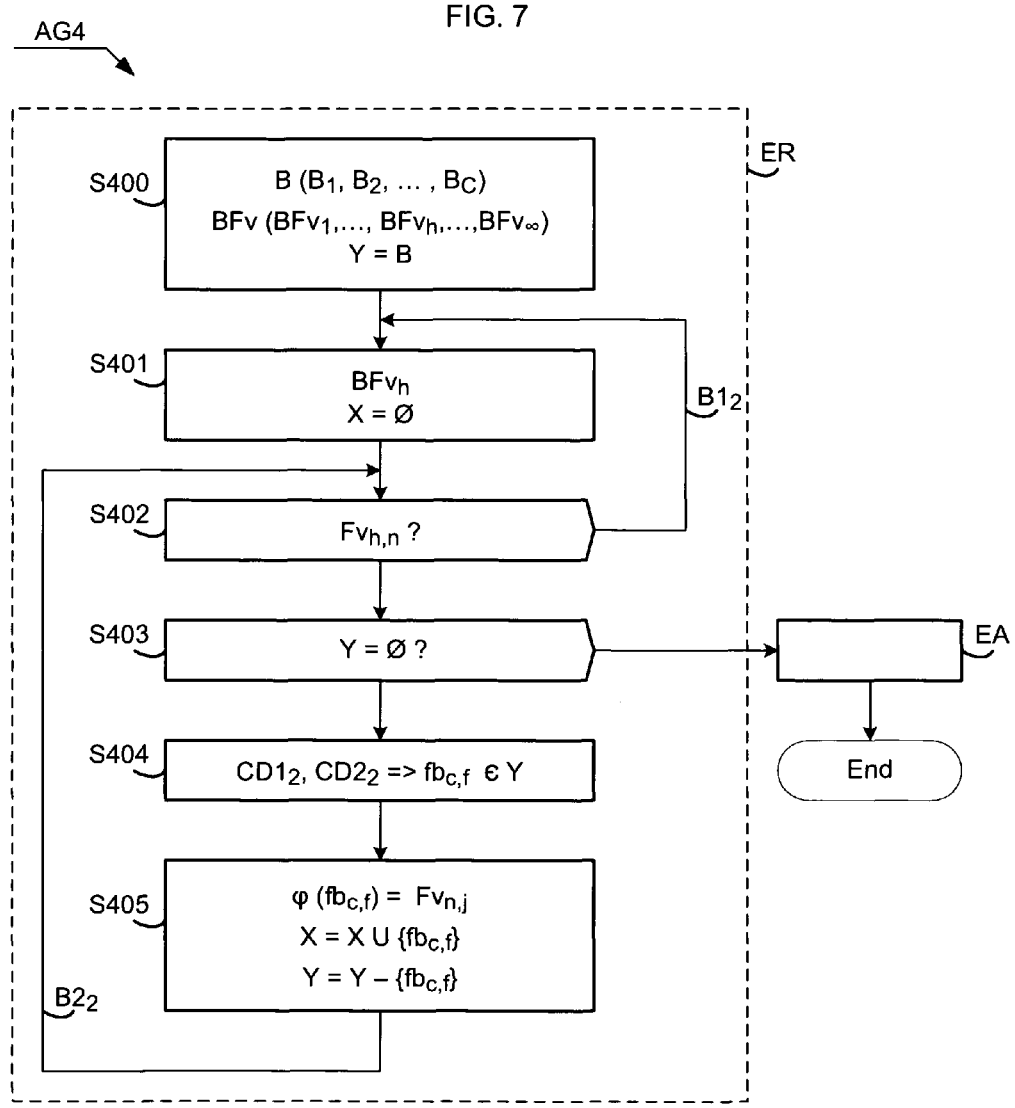
FIG. 7 shows an algorithm for distributing carrier frequencies according to a second embodiment of the method of the invention.

With reference to FIG. 7, the distribution unit UR of the scheduling device executes the step EP of distributing the virtual frequencies of the set B in virtual frequency blocks as a function of the distribution rules RR1, RR2 and RR3. Then, the association unit UA of the device DP executes the step EA of associating the virtual frequency blocks in which the virtual frequencies of the set B have been distributed, with the J real frequency blocks as a function of the frequency reuse rules RU.

The algorithm AG=AG4 of the second implementation executed by the distribution unit UR comprises steps S400 to S405 including a first iterative loop $B1_2$ for selecting a virtual frequency block $BFv_h$ and a second iterative loop $B2_2$ for selecting a carrier frequency $Fv_{n,h}$ of this virtual frequency block $BFv_h$.

Initially, in step S400, the device defines and stores in the memory ME the first set B and the set of virtual frequency blocks. The device also defines a set Y comprising the virtual carrier frequencies of the set B which have not yet been processed, that is to say which have not yet been bijectively mapped with a frequency of a virtual frequency block. The set Y is stored in the memory ME of the device DP and is initially equal to the set B.

In step S401, the distribution unit UR executes the first iterative loop $B1_2$ by selecting a virtual frequency block $BFv_h$ and by defining an initially empty set X, intended to comprise the virtual carrier frequencies of the set B which have already been bijectively mapped with carrier frequencies $Fv_{n,h}$ of the selected frequency block $BFv_h$. With each selection of a new frequency block, the set X is initialized to the empty set. The set X is stored in the memory ME.

Then, in step S402, the unit UR executes the second iterative loop $B2_2$, by verifying whether all the carrier frequencies of the virtual frequency block $BFv_h$ have been processed. If some frequencies of the virtual frequency block $BFv_h$ have not been processed, the unit UR selects one of them $Fv_{j,n}$, either in a successive manner by incrementing a variable associated with each index n of the frequencies $Fv_{j,n}$, or in a random manner. If all the N frequencies $Fv_{h,1}$ to $Fv_{h,N}$ of the virtual frequency block $BFv_h$ have already been selected, the second iterative loop $B2_2$ stops and the first loop $B1_2$ is again iterated in step S401 so as to select a new virtual frequency block.

During the selection of a new carrier frequency $Fv_{n,h}$ in the virtual frequency block $BFv_h$, in step S402, the unit UR verifies in step S403 whether there are still virtual carrier frequencies in the set Y. If all the frequencies of the set B have been processed in step S403, that is to say the set Y is empty, the distribution unit UR terminates executing the algorithm AG=AG4 and the association unit UA executes the association step EA which will be described subsequently.

If there are still virtual carrier frequencies in the set Y in step S403, the unit UR selects in step S404 a carrier frequency $fb_{c,f}$ in the set Y which complies with the two distribution conditions $CD1_2$ and $CD2_2$ relating to the distribution rules RR1, RR2 and RR3 of the invention.

According to the first condition $CD1_2$, relating more particularly to the rules RR1 and RR3, the carrier frequency $fb_{c,f}$ must be selected such that the frequency interference emitted by the set of cells associated with the frequency $fb_{c,f}$ and with the frequencies of the set X—that is to say the frequencies already distributed in the virtual frequency block $BFv_h$, correspond to the smallest interfered surface area Slmin. The unit UR determines the interfered surface area by means of frequency propagation prediction procedures known to the person skilled in the art for each virtual carrier frequency of the set Y, and selects the frequency $fb_{q,f}$ associated with the smallest interfered surface area and which also complies with the second condition $CD2_2$.

According to the second condition $CD2_2$, associated more particularly with the second distribution rule RR2, the frequency $fb_{q,f}$ must be selected in such a way that for any virtual frequency $F\alpha$ belonging to the set X of frequencies distributed in the virtual frequency block $BFv_h$ and being associated—together with the frequency $fb_{q,f}$—with one and the same cell, each frequency $\phi(F\alpha)$ of the block of frequencies $BFv_h$ corresponding bijectively to each frequency $F\alpha$ complies with the constraint of minimum frequency gap $\Delta$fe with respect to the frequency $Fv_{n,h}$ and according to the distribution rule RR2. This condition $CD2_2$ makes it possible to verify that virtual carrier frequencies belonging to the same group of frequencies $B_C$ and distributed in one and the same frequency block are spaced apart by a minimum frequency gap $\Delta$fe so as to avoid any frequency interference between frequencies associated with one and the same cell.

In step S405, the unit UR bijectively maps the frequency $fb_{q,f}$ selected from the set Y with the frequency $Fv_{n,h}$: $\phi(fb_{q,f})=Fv_{n,h}$, the frequency $fb_{q,f}$ belonging to the first set B of virtual carrier frequencies and the frequency $Fv_{n,h}$ belonging to the virtual block $BFv_h$. The mapping is stored in the memory ME of the device DP. The sets X and Y are updated such that the frequency $fb_{q,f}$ is included in the set X ($X=X \cup \{fb_{q,f}\}$) and is excluded from the set Y ($Y=Y-\{fb_{q,f}\}$). At the end of step S405, the unit UR repeats the second loop $B2_2$ which loops back to step S401, so as to select a new carrier frequency of the frequency block $BFv_h$.

Once all the carrier frequencies of the set B have been distributed in virtual frequency blocks, the device DP executes the association step EA so as to associate the virtual frequency blocks in which the virtual carrier frequencies of the set B are distributed, with real frequency blocks of the frequency band ΔFsy of the system SY while considering the limitation of the frequency resources and the reuse rules RU known from the narrowband radiocommunication systems. Several virtual frequency blocks may be associated with one and the same real frequency block of the frequency band. At the end of the step EA, the frequency scheduling PF is determined as a function of the distribution of the carrier frequencies in each real frequency block of the frequency band and the association of each of these carrier frequencies with one or more cells of the communication system SY.

A simplifying variant of the algorithm AG4, called algorithm AG5, similar to the algorithm AG3 of the first implementation, is to seek the pairs of cells such that the surface interfered with by the emission of the carrier frequencies associated with the selected pair of cells is the smallest.

The association step EA then consists in generating a frequency plan PF of real carrier frequencies by associating real frequency blocks with the virtual frequency blocks using techniques well known to the person skilled in the art. The device PF considers each virtual frequency block as a group and applies the conventional scheduling and frequency reuse rules RU for narrowband systems to associate the virtual frequency blocks with the real frequency blocks.

A third step (not represented in FIG. 7) can optionally be applied by considering that the order of the frequencies in a virtual block is defined only insofar as the constraint of minimum spacing between two carrier frequencies associated with one and the same cell is satisfied. After the frequency scheduling has been established, that is to say the association of the real frequencies with a virtual frequency block, the device permutes the frequencies inside this block with the proviso that the minimum gap constraint is still complied with by the permutation performed.

In particular, in the case of the algorithm AG5, this permutation amounts to permuting the roles of the cells $C_i$ and $C_j$ and to seeking which of these two permutations leads to the lowest interference level.

Once the distribution of the frequencies of the narrowband system has terminated, the scheduling of the broadband system may be performed, the frequency blocks used in a cell of the broadband system being the frequencies which are not interfered with by the carriers of the narrowband system and which do not interfere with the carriers of the narrowband system. The method according to the invention guarantees an optimum or near optimum number for the number of available frequency blocks, without interference with the carriers of the narrowband system.

The descriptions hereinabove are given merely by way of example to illustrate the invention and the person skilled in the art will be able to define variants of these embodiments while remaining within the framework of the invention.

The invention described here relates to a method, a radiocommunication system consisting of a narrowband radiocommunication system and a broadband radiocommunication system both co-located in part or totally on the same frequency band, a scheduling device and at least one base station of the narrowband radiocommunication system. According to one embodiment, the steps of the method of the invention are determined by the instructions of a computer program incorporated into the scheduling device DP. The computer program able to be implemented in the scheduling device comprises program instructions which, when said program is executed in the device whose operation is then controlled by the execution of the program, carry out an allocation of carrier frequencies of the narrowband base station in accordance with the method of the invention.

Consequently, the invention also applies to a computer program, in particular a computer program recorded on or in a recording medium readable by a computer and any data processing device suitable for implementing the invention. This program can use any programming language, and be in the form of source code, object code, or of code intermediate between source code and object code such as in a partially compiled form, or in any other desirable form for implementing the method according to the invention. The program may be downloaded into the device via a communication network such as the Internet.

The recording medium may be any entity or any device capable of storing the program. For example, the medium can comprise a storage means on which the computer program according to the invention is recorded, such as a ROM, for example a CD ROM or a microelectronic circuit ROM, or else a USB key, or a magnetic recording means, for example a hard disk.

The invention claimed is:

1. A method for scheduling carrier frequencies for a narrowband radiocommunication system sharing with a broadband radiocommunication system, in one and the same geographical zone, radioelectric transmission cells each comprising a narrowband base station and a broadband base station, and one and the same frequency band, the frequency band being in part divided into a given number of frequency blocks, each comprising a given number of carrier frequencies to optionally be allocated to each narrowband base station, the method comprising:

a step of distributing the carrier frequencies to be allocated to the narrowband base stations over the frequency band such that each frequency block comprises at least two distinct groups of carrier frequencies, each associated with a different narrowband base station, the at least two distinct groups of carrier frequencies being selected according to a distribution rule such that interference relating to the emission of the narrowband base stations associated with groups of carrier frequencies distributed in one and the same frequency block has a minimum interfered surface area, such distributing including bijectively mapping each carrier frequency of one of the groups of the first set with a carrier frequency of a frequency block while complying, on the one hand, with the distribution rule and, on the other hand, with a minimum frequency gap between the carrier frequencies of one and the same group of carrier frequencies bijectively mapped with carrier frequencies of one and the same frequency block; and an association step determining a first set of first groups of carrier frequencies, each first group of carrier frequencies of which is associated with one or more narrowband base stations according to reuse rules.

2. The method as claimed in claim 1, according to which in the distribution step the at least two distinct groups of carrier frequencies are distributed in a frequency block by alternately intercalating each carrier frequency of one group with respectively each carrier frequency of the other group so as to comply with a minimum frequency gap between the carrier frequencies of one and the same group of carrier frequencies.

3. The method as claimed in claim 1 comprising an establishment of a frequency scheduling which associates each narrowband base station of the narrowband radiocommunication system with at least one group of carrier frequencies from among several groups of carrier frequencies distributed per frequency block over the frequency band according to the distribution rule.

4. The method as claimed in claim 1, according to which the narrowband radiocommunication system and the broadband radiocommunication system are radiocommunication systems of FDD type sharing in the same frequency band a first frequency band intended for uplink communications from mobile terminals to base stations of one of the two radiocommunication systems and a second frequency band intended for downlink communications from base stations to mobile terminals of one of the two radiocommunication systems, the distribution of the carrier frequencies by frequency block being carried out in a similar manner in the first frequency band and in the second frequency band.

5. The method as claimed in claim 1, according to which the distribution step comprises a first iterative loop for selecting each frequency block of the frequency band and a second iterative loop for selecting each carrier frequency of the selected frequency block, and comprising in the second iterative loop a bijective mapping of the carrier frequency of the frequency block with a carrier frequency of the first set while complying with the distribution rule and the minimum frequency gap between carrier frequencies of one and the same group of carrier frequencies distributed in one and the same frequency block.

6. The method as claimed in claim 5 according to which each second iterative loop comprises a step of bijectively mapping a carrier frequency of a first group of carrier frequencies with the selected carrier frequency of the selected frequency block as soon as another carrier frequency of the first group of carrier frequencies has been bijectively mapped with another carrier frequency of the frequency block selected during a previous second iterative loop.

7. The method as claimed in claim 1 according to which the number of carrier frequencies of each first group of carrier frequencies is at most equal to half of the number of carrier frequencies of a frequency block and the distribution step comprises an iterative loop for selecting each frequency block of the frequency band comprising a selection according to the distribution rule of two first groups of carrier frequencies belonging to the first set and a bijective mapping successively of a carrier frequency of the frequency block with alternately a carrier frequency of one of the first two groups while complying with the minimum frequency gap between carrier frequencies of one and the same first group of carrier frequencies.

8. The method as claimed in claim 1, according to which the method comprises the following successive steps:
  the step of distributing a first set of first groups of carrier frequencies, associated respectively with the narrowband base stations, each first group being distributed with at least one other different first group in one and the same virtual frequency block belonging to a set of virtual frequency blocks while complying with a minimum frequency gap between the carrier frequencies of one and the same group and while complying with the distribution rule, the set of virtual frequency blocks comprising a number greater than or equal to the given number of frequency blocks of the frequency band, and
  an association step for associating each virtual frequency block with a frequency block of the frequency band while complying with carrier frequency reuse rules.

9. A narrowband radiocommunication system comprising:
  radioelectric transmission cells each being shared with a broadband radiocommunication system, in one and the same geographical zone, and each comprising:
    a narrowband base station;
    a broadband base station; and
    one and the same frequency band, the frequency band being in part divided into a given number of frequency blocks, each frequency block comprising:
      a given number of carrier frequencies to optionally be allocated to each narrowband base station, characterized in that the carrier frequencies of the narrowband radiocommunication system allocated to narrowband base stations are distributed over the frequency band such that each frequency block comprises at least two distinct groups of carrier frequencies, each allocated to a different narrowband base station, the at least two distinct groups of carrier frequencies being selected according to a distribution rule such that interference relating to the emission of the narrowband base stations associated with groups of carrier frequencies distributed in one and the same frequency block has a minimum interfered surface area, such distributing including bijectively mapping each carrier frequency of one of the groups of the first set with a carrier frequency of a frequency block while complying, on the one hand, with the distribution rule and, on the other hand, with a minimum frequency gap between the carrier frequencies of one and the same group of carrier frequencies bijectively mapped with carrier frequencies of one and the same frequency block, and a first set of first groups of carrier frequencies is determined, each first group of carrier frequencies of which is associated with one or more narrowband base stations according to reuse rules.

10. A narrowband base station of a radioelectric transmission cell, the radioelectric transmission cell being shared with a broadband radiocommunication system, in one and the same geographical zone, and the radioelectric transmission cell being of a narrowband radiocommunication system and comprising the narrowband base station and a broadband base station, and one and the same frequency band, the narrowband base station comprising:
  a memory; and
  a distribution unit including one or more processors, the distribution unit configured for dividing the frequency band, in part, into a given number of frequency blocks, each comprising a given number of carrier frequencies to optionally be allocated to the narrowband base station, characterized in that the carrier frequencies allocated to the narrowband base station are distributed over the frequency band with other carrier frequencies allocated to other base stations so that each frequency block comprises at least two distinct groups of carrier frequencies, each allocated to a different narrowband base station, the at least two distinct groups of carrier frequencies being selected according to a distribution rule such that interference relating to the emission of the narrowband base station, which is associated with groups of carrier frequencies distributed in one and the same frequency block has a minimum interfered surface area, such distributing including bijectively mapping each carrier frequency of one of the groups of the first set with a carrier frequency of a frequency block while complying, on the one hand, with the distribution rule and, on the other hand, with a minimum frequency gap between the carrier frequencies of one and the same group of carrier frequencies bijectively mapped with carrier frequencies of one and the same frequency block, and a first set of first groups of carrier frequencies is determined, each first group of carrier frequencies of which is associated with one or more narrowband base stations according to reuse rules.

11. A device for scheduling carrier frequencies for a narrowband radiocommunication system sharing with a broadband radiocommunication system, in one and the same geographical zone, radioelectric transmission cells each comprising a narrowband base station and a broadband base station, and one and the same frequency band, the device comprising:

means for dividing the frequency band, in part, into a given number of frequency blocks, each comprising a given number of carrier frequencies to optionally be allocated to each narrowband base station, characterized in that it comprises a means for associating carrier frequencies with the narrowband base stations and a means for distributing over the frequency band the carrier frequencies associated with the narrowband base stations such that each frequency block comprises at least two distinct groups of carrier frequencies, each associated with a different narrowband base station, the at least two groups of distinct carrier frequencies being selected according to a distribution rule such that interference relating to the emission of the narrowband base stations associated with groups of carrier frequencies distributed in one and the same frequency block has a minimum interfered surface area, such distributing including bijectively mapping each carrier frequency of one of the groups of the first set with a carrier frequency of a frequency block while complying, on the one hand, with the distribution rule and, on the other hand, with a minimum frequency gap between the carrier frequencies of one and the same group of carrier frequencies bijectively mapped with carrier frequencies of one and the same frequency block, and a first set of first groups of carrier frequencies is determined, each first group of carrier frequencies of which is associated with one or more narrowband base stations according to reuse rules.

12. A non-transitory storage medium able to be implemented in a scheduling device so as to schedule the carrier frequencies for a narrowband radiocommunication system sharing with a broadband radiocommunication system, in one and the same geographical zone, radioelectric transmission cells each comprising a narrowband base station and a broadband base station, and one and the same frequency band, the frequency band being in part divided into a given number of frequency blocks, each comprising a given number of carrier frequencies to optionally be allocated to the narrowband base stations, said non-transitory storage medium being characterized in that it comprises instructions which, when the non-transitory storage medium is executed in said scheduling device, carry out the steps of the scheduling method as claimed in claim 1.

* * * * *